US012656256B2

(12) United States Patent
Hsieh et al.

(10) Patent No.: US 12,656,256 B2
(45) Date of Patent: Jun. 16, 2026

(54) ANALYTICAL BIOCHIP AND FORMING METHOD THEREOF

(71) Applicant: VisEra Technologies Company Ltd., Hsin-Chu City (TW)

(72) Inventors: Hsin-Yi Hsieh, Hsin-Chu City (TW); Kuo-Fang Chung, Hsin-Chu City (TW); Po-Han Fu, Hsin-Chu City (TW); Yi-Hua Chiu, Hsin-Chu City (TW); Ming-Yee Wong, Hsin-Chu City (TW); Yi-Hsin Tai, Hsin-Chu City (TW); Chin-Chuan Hsieh, Hsin-Chu City (TW)

(73) Assignee: VISERA TECHNOLOGIES COMPANY LTD., Hsin-Chu City (TW)

( * ) Notice: Subject to any disclaimer, the term of this patent is extended or adjusted under 35 U.S.C. 154(b) by 163 days.

(21) Appl. No.: 18/816,166

(22) Filed: Aug. 27, 2024

(65) Prior Publication Data

US 2026/0063552 A1     Mar. 5, 2026

(51) Int. Cl.
*G01N 23/00*      (2006.01)
*G01N 21/64*      (2006.01)

(52) U.S. Cl.
CPC ..... *G01N 21/6454* (2013.01); *G01N 21/6428* (2013.01); *G01N 2021/6439* (2013.01); *G01N 2021/6465* (2013.01); *G01N 2021/6482* (2013.01); *G01N 2201/0635* (2013.01); *G01N 2201/0873* (2013.01)

(58) Field of Classification Search
CPC ... G01N 2021/6439; G01N 2021/6465; G01N 2021/6482; G01N 2021/6428; G01N 21/6454; G01N 2201/0635; G01N 2201/0873
See application file for complete search history.

(56) References Cited

U.S. PATENT DOCUMENTS

| | | | |
|---|---|---|---|
| 12,533,420 B2 * | 1/2026 | Grawunder | ........ A61K 47/6849 |
| 2011/0306143 A1 * | 12/2011 | Chiou | ................ G01N 21/7703 |
| | | | 422/82.11 |
| 2015/0141267 A1 | 5/2015 | Rothberg et al. | |
| 2021/0215607 A1 * | 7/2021 | Berman | ............... G01N 21/648 |
| 2022/0075263 A1 * | 3/2022 | Yuan | .................. G01N 21/0303 |
| 2022/0134333 A1 | 5/2022 | Modiano et al. | |

FOREIGN PATENT DOCUMENTS

| | | |
|---|---|---|
| TW | 201144793 A1 | 12/2011 |
| TW | 201231952 A1 | 8/2012 |

* cited by examiner

*Primary Examiner* — Dani Fox

(74) *Attorney, Agent, or Firm* — MUNCY, GEISSLER, OLDS & LOWE, P.C.

(57) ABSTRACT

An analytical biochip includes a substrate, a lower cladding layer, a waveguide, an upper cladding layer, an emission light collection element and a plurality of nanowells. The lower cladding layer is over the substrate. The waveguide is over the lower cladding layer. The upper cladding layer is over the waveguide. The emission light collection element is over the upper cladding layer, wherein the emission light collection element includes lower protrusion structures extending into the upper cladding layer, and the emission light collection element is made of metal. The nanowells penetrate the emission light collection element and are in the upper cladding layer.

20 Claims, 33 Drawing Sheets

100

152
142

B'

B

132(133A)

140
130
120
110

SL

S1
S2

ANALYTICAL BIOCHIP AND FORMING METHOD THEREOF

BACKGROUND

Field of Disclosure

The present disclosure relates to an analytical biochip and forming method thereof.

Description of Related Art

Analytical chips can be used to detect the existence of the certain biomolecules. Generally, samples are disposed in nanowells, and the samples are labelled with fluorescent tags. The samples are excited by an excitation energy, and the excitation energy illuminates the fluorescent tags of the samples to cause the emission light from the samples. The light emitted from the samples is collected to identify if the certain biomolecules exist.

SUMMARY

Some embodiments of the present disclosure provides an analytical biochip including a substrate, a lower cladding layer, a waveguide, an upper cladding layer, an emission light collection element and a plurality of nanowells. The lower cladding layer is over the substrate. The waveguide is over the lower cladding layer, in which the waveguide comprises a grating coupler and a guiding portion coupled to the grating coupler, wherein the grating coupler is configured to receive excitation energy from an excitation source, and the guiding portion is configured to guide the excitation energy. The upper cladding layer is over the waveguide. The emission light collection element is over the upper cladding layer, wherein the emission light collection element includes lower protrusion structures extending into the upper cladding layer, and the emission light collection element is made of metal. The nanowells penetrate the emission light collection element and are in the upper cladding layer. The plurality of nanowells are configured to receive samples tagged with fluorescent tags, and at least a portion of the guiding portion of the waveguide is directly below the plurality of nanowells. Each of the plurality of nanowells is spaced apart from the grating coupler, and the excitation energy is guided by the guiding portion of the waveguide toward the plurality of nanowells to thereby enable the fluorescent tags of the samples in the plurality of nanowells to absorb the excitation energy and emit light.

In some embodiments, in each of the plurality of nanowells, a depth of the nanowell is greater than a diameter of the nanowell.

In some embodiments, in each of the nanowells, an area of a top opening of the nanowell is a first area, a sum of an area of a sidewall of the nanowell and an area of a bottom opening of the nanowell is a second area, and the first area is less than half of the second area.

In some embodiments, the analytical biochip further includes a sacrificial layer conformally disposed over the emission light collection element and sidewalls of the plurality of nanowells.

In some embodiments, the substrate, the lower cladding layer, the waveguide, the upper cladding layer, and the emission light collection element are stacked in a first direction. The plurality of nanowells include a first nanowell and a second nanowell. When viewed in a cross section cut along the first direction and that intersects the grating coupler and the first and second nanowells, the second nanowell is farther from the grating coupler than the first nanowell in a second direction perpendicular to the first direction, and a distance between a bottom opening of the second nanowell and an upper surface of the guiding portion of the waveguide is less than a distance between a bottom opening of the first nanowell and the upper surface of the guiding portion of the waveguide.

In some embodiments, a diameter of a top opening of the second nanowell is greater than a diameter of a top opening of the first nanowell.

In some embodiments, a distance between a top opening of the second nanowell and the upper surface of the guiding portion of the waveguide is less than a distance between a top opening of the first nanowell and the upper surface of the guiding portion of the waveguide, and a diameter of the top opening of the second nanowell and a diameter of the top opening of the first nanowell are identical.

In some embodiments, the grating coupler includes a grating structure protruding towards the upper cladding layer.

In some embodiments, the grating coupler includes a first grating structure protruding towards the lower cladding layer, and a second grating structure protruding towards the upper cladding layer.

In some embodiments, the analytical biochip further includes a light focusing monitor below bottom openings of the plurality of nanowells.

In some embodiments, the substrate is a transparent substrate, and the light focusing monitor is a virtual monitor with a minimum resolvable diameter by a lens or objective under the substrate.

In some embodiments, the substrate is a semiconductor substrate, and the light focusing monitor is a photodiode over the substrate.

In some embodiments, the upper cladding layer includes upper protrusion structures, and the upper protrusion structures are gratings.

In some embodiments, the upper cladding layer includes upper protrusion structures, and the upper protrusion structures are meta-atoms of a metasurface.

Some embodiments of the present disclosure provide a method of forming an analytical biochip includes forming a lower cladding layer over a substrate, forming a waveguide over the lower cladding layer, in which the waveguide includes a grating coupler and a guiding portion coupled to the grating coupler, wherein the grating coupler is configured to receive excitation energy from an excitation source, and the guiding portion is configured to guide the excitation energy, forming an upper cladding layer over the waveguide, patterning the upper cladding layer to form upper protrusion structures at an upper surface of the upper cladding layer, forming an emission light collection element covering the upper protrusion structures, in which portions of the emission light collection element extends into the upper cladding layer, and the emission light collection element is made of metal, and forming a plurality of nanowells penetrating the emission light collection element and in the upper cladding layer, in which the plurality of nanowells are configured to receive samples tagged with fluorescent tags, and at least a portion of the guiding portion of the waveguide is directly below the plurality of nanowells, in which each of the plurality of nanowells is spaced apart from the grating coupler, and the excitation energy is guided by the guiding portion of the waveguide toward the plurality of nanowells to thereby enable the fluorescent tags of the samples in the plurality of nanowells to absorb the excitation energy and emit light.

In some embodiments, the substrate, the lower cladding layer, the waveguide, the upper cladding layer, and the emission light collection element are stacked in a first direction, the plurality of nanowells include a first nanowell and a second nanowell, when viewed in a cross section cut along the first direction and that intersects the grating coupler and the first and second nanowells, the second nanowell is farther from the grating coupler than the first nanowell in a second direction perpendicular to the first direction, and a distance between a bottom opening of the second nanowell and an upper surface of the guiding portion of the waveguide is less than a distance between a bottom opening of the first nanowell and the upper surface of the guiding portion of the waveguide.

In some embodiments, the method further includes forming a sacrificial layer conformally over the emission light collection element and the plurality of nanowells, and removing the sacrificial layer at bottom openings of the plurality of nanowells.

In some embodiments, in each of the plurality of nanowells, a depth of the nanowell is greater than a diameter of a top opening of the nanowell.

In some embodiments, in each of the plurality of nanowells, an area of a top opening of the nanowell is a first area, a sum of an area of a sidewall of the nanowell and an area of a bottom opening of the nanowell is a second area, and the first area is less than half of the second area.

In some embodiments, the method further includes coating an adherent layer conformally over the sacrificial layer and the bottom openings of the nanowells, and removing the sacrificial layer and the adherent layer conformally over the sacrificial layer.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
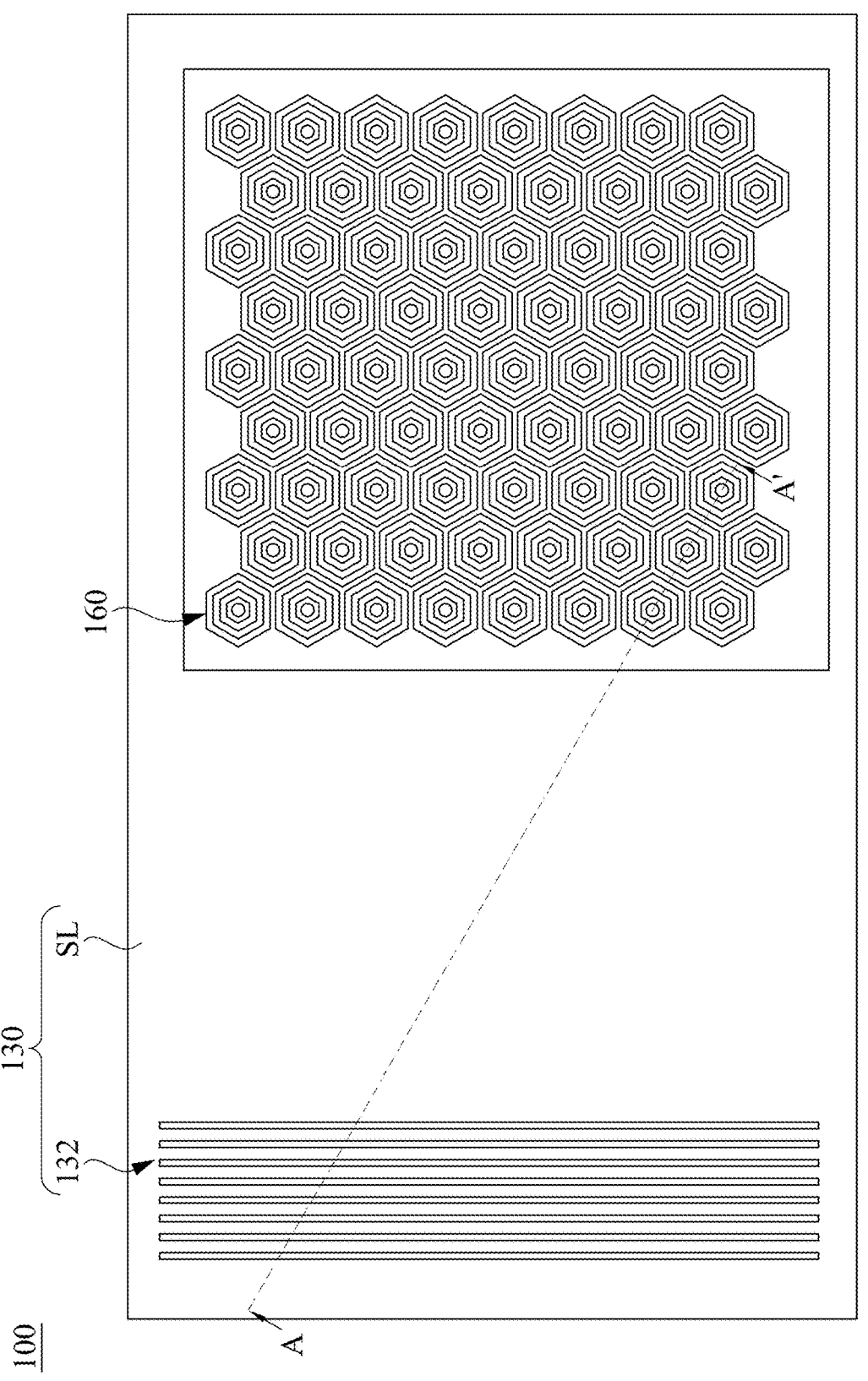
FIG. 1A illustrates a top view of an analytical biochip in some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
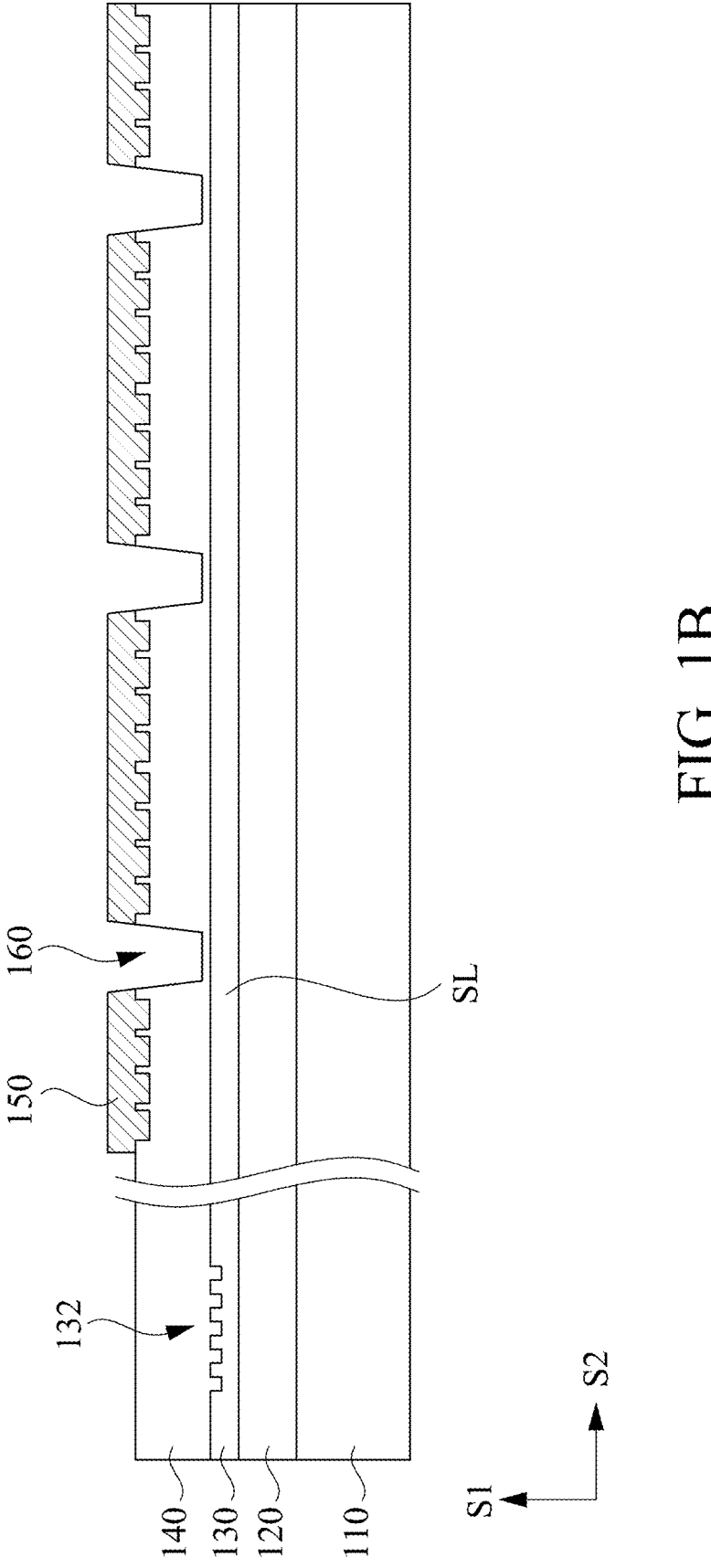
FIG. 1B illustrates a cross-section view taken along line A-A' of FIG. 1A.

FIG. 1A illustrates a top view of an analytical biochip 100 in some embodiments of the present disclosure. FIG. 1B illustrates a cross-section view taken along line A-A' of FIG. 1A. The analytical biochip 100 includes a substrate 110, a lower cladding layer 120, a waveguide 130, an upper cladding layer 140, an emission light collection element 150 and a plurality of nanowells 160. The lower cladding layer 120 is over the substrate 110. The waveguide 130 is over the lower cladding layer 120, and the waveguide 130 includes a grating coupler 132 and a guiding portion SL coupled to the grating coupler 132. The upper cladding layer 140 is over the waveguide 130. The emission light collection element 150 is over the upper cladding layer 140. The nanowells 160 penetrate the emission light collection element 150 and are in the upper cladding layer 140, and each of the nanowells 160 is spaced apart from the grating coupler 132. Stated another way, the substrate 110, the lower cladding layer 120, the waveguide 130, the upper cladding layer 140, and the emission light collection element 150 are stacked in a first direction S1, and the cross section in FIG. 1B is cut along line A-A' and the first direction S1 and that intersects the grating coupler 132 and the nanowells 160 (such as the first nanowell 162 and the second nanowell 164 in FIGS. 20 and 24), and FIG. 1B illustrates the grating coupler 132 and the nanowells 160 arranged along a second direction S2 perpendicular to the first direction S1. That is, the grating coupler 132 does not overlap the nanowells 160 in the second direction S2.

Figure 2A:
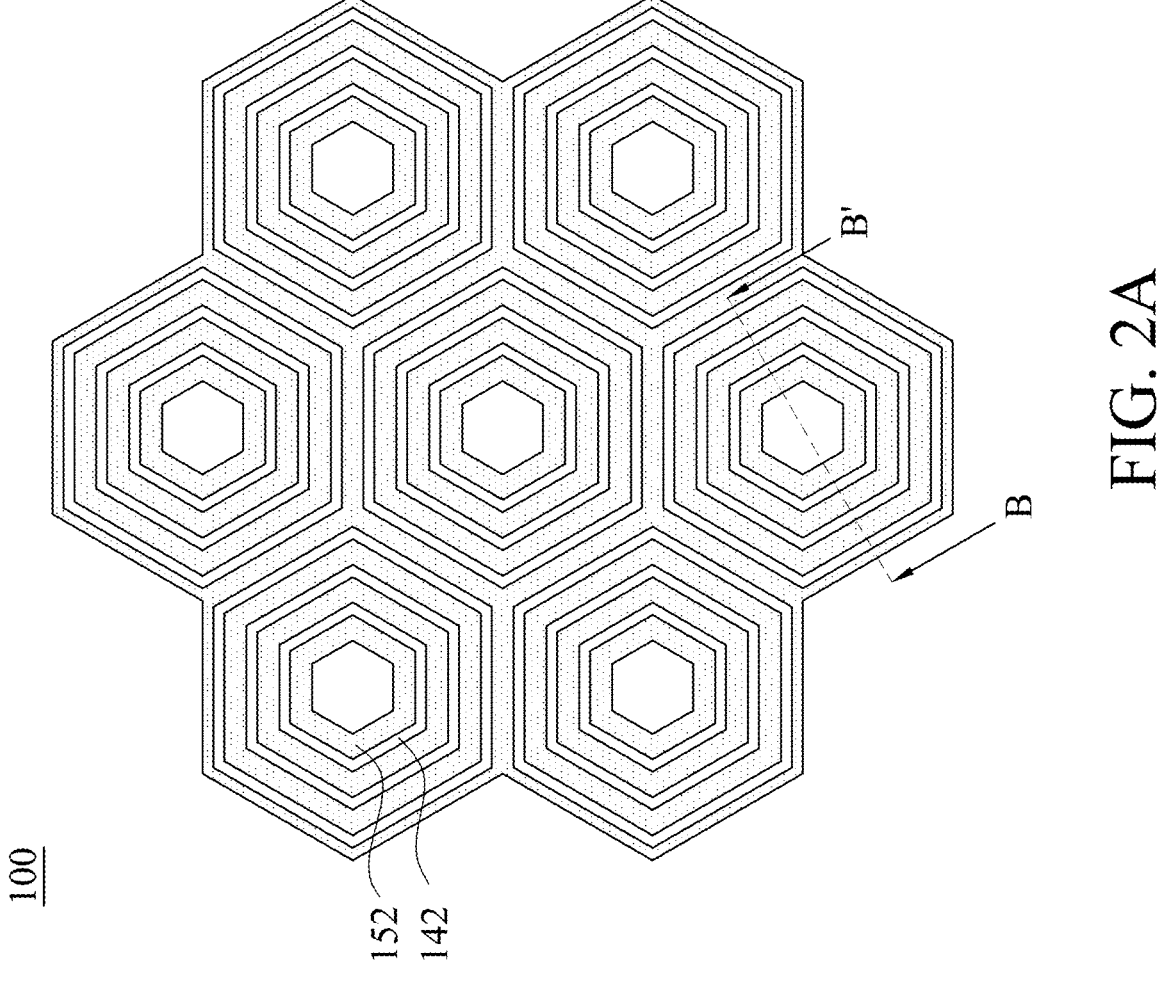
FIG. 2A illustrates an enlarged top view of a portion of the analytical biochip 100 in FIG. 1A.
Figure 2B:
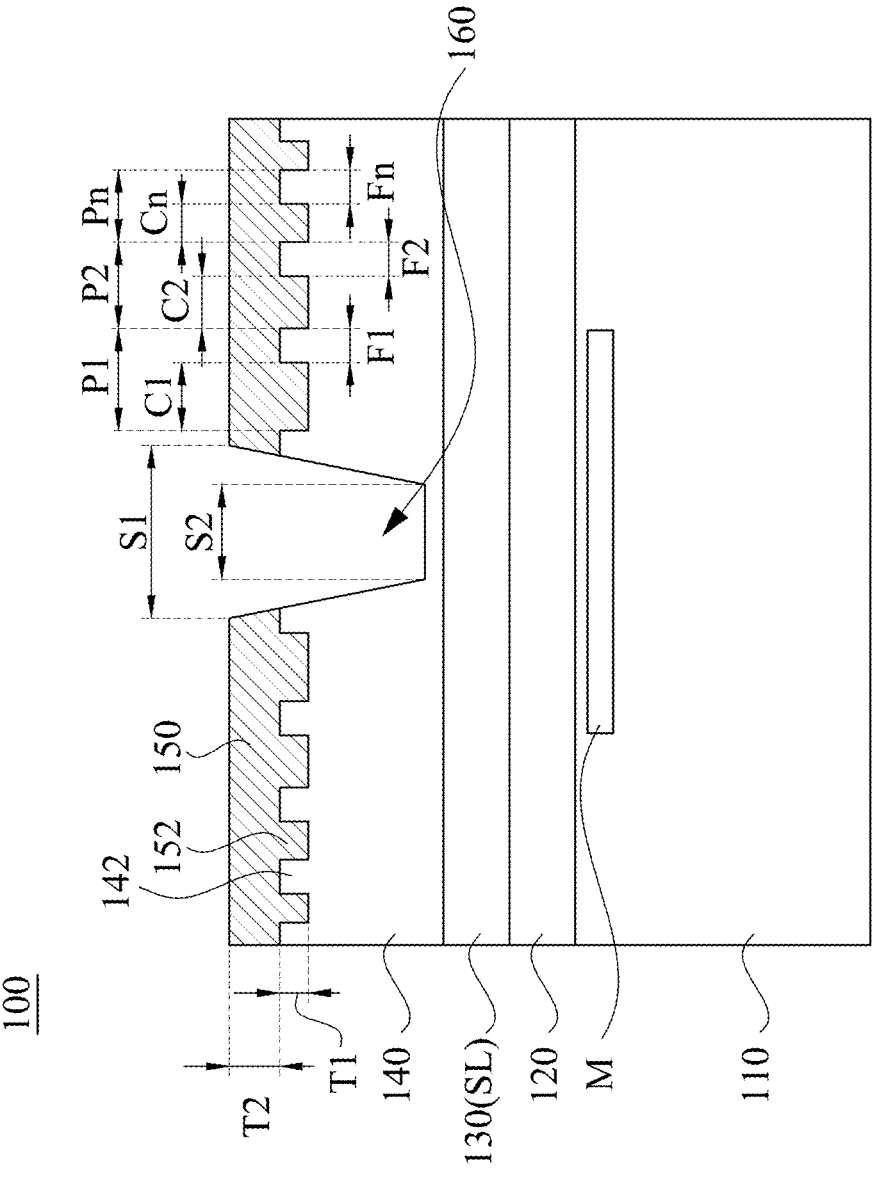
FIG. 2B illustrates a cross-section view taken along line B-B' of FIG. 2A.

FIG. 2A illustrates an enlarged top view of a portion of the analytical biochip 100 in FIG. 1A. FIG. 2B illustrates a cross-section view taken along line B-B' of FIG. 2A. The analytical biochip 100 in the present disclosure is used to detect the existence of certain biomolecules. Specifically, the nanowells 160 are configured to receive samples tagged with fluorescent tags. The grating coupler 132 is configured to receive excitation energy from an excitation source, and the guiding portion SL is configured to guide the excitation energy. At least a portion of the guiding portion SL of the waveguide 130 is directly below the nanowells 160. Therefore, excitation energy is guided by the guiding portion SL of the waveguide 130 toward the nanowells 160 to thereby enable the fluorescent tags of the samples in the nanowells 160 to absorb the excitation energy and emit light. The light emitted from the samples is collected to identify if the certain biomolecules exist. In some embodiments, the waveguide 130 is a planar waveguide (as shown in FIG. 1A), and the guiding portion SL may be a slab. In a planar waveguide, the excitation energy is guided in one direction, and the grating coupler 132 is a combination of straight gratings parallel to each other. In some embodiments, the excitation source may be light at certain wavelength, such as visible light. In some embodiments, a diameter D1 of the top opening of the nanowell 160 is mainly between 150 nm and 500 nm (and could extend to 100-1000 nm), the diameter D2 of the bottom opening of the nanowell 160 is between 50 and 350 nm (and could extend to 50-800 nm), the depth of the nanowell 160 is between 150 and 600 nm (and could extend to 100-1200 nm), and the distance between the bottom opening of the nanowell 160 and the waveguide 130 is less than 200 nm, usually 0-60 nm.

The light emitted from the samples is collected by different methods. The analytical biochip 100 includes a light focusing monitor M below bottom openings of the nanowells 160 to collect light emitted from the samples for further analysis. In some embodiments, the light can be directly collected by the analytical biochip 100 itself, for example, by photodiodes. That is, the light focusing monitor M may be photodiodes in the substrate 110. In some embodiments, the length of the photodiode may be between 500 nm and 6 μm. Therefore, the substrate 110 may be a semiconductor substrate, such as a circuit board. In some embodiments, the analytical biochip 100 may be mounted in a microscope system, and the location of the light focusing monitor M is a virtual region where the emission light energy is condensed via the emission light collection element 150 below the nanowell 160. The light focusing monitor M is virtual monitor with a minimum resolvable diameter by a lens or objective under the substrate 110. That is, the light focusing monitor is a lens focusing region in a minimum resolution (such as microscope objectives MC in FIG. 3) located in the focal plane (such as focal plane FP2 in FIG. 3), the substrate 110 is a transparent substrate, so the light can be collected by the microscope system.

The waveguide 130 may be made of dielectric material, such as $Si_3N_4$, $Ta_2O_5$, $TiO_2$, $Al_2O_3$, $Nb_2O_5$. In some embodiments, the thickness of the waveguide 130 is between 80 nm and 300 nm (and could extend to 500 nm). The waveguide 130 is cladding by the lower cladding layer 120 and the upper cladding layer 140. The lower cladding layer 120 and the upper cladding layer 140 may be used to improve collection of light from the nanowells 160 to the substrate 110. The lower cladding layer 120 and the upper cladding layer 140 may be made of dielectric material, such as $SiO_2$. The refractive index of the lower cladding layer 120 and the upper cladding layer 140 may be selected to improve collection of light from the nanowells 160 to the substrate 110. In some embodiments, the refractive index of the waveguide 130 is greater than the refractive index of the lower cladding layer 120 and the upper cladding layer 140. For example, the refractive index of the lower cladding layer 120 and the upper cladding layer 140 is between 1.4 and 1.6, and the refractive index of the waveguide 130 is 1.65-2.8 at the visible light wavelength. In some embodiments, the thickness of the lower cladding layer 120 is between 10 nm and 3000 nm, and the thickness of the upper cladding layer 140 is between 200 nm and 2000 nm.

To enhance the emission light collection ratio from the samples in the nanowells 160, the emission light collection element 150 is provided over the upper cladding layer 140. Specifically, the emission light collection element 150 includes lower protrusion structures 152 extending into the upper cladding layer 140, and the emission light collection element 150 is made of metal, such as Al, Ag, Au, Cu, W, Pt, Ti, Ni, Nb, Cr. Stated another way, the upper cladding layer 140 includes upper protrusion structures 142 at an upper surface of the upper cladding layer 140. The upper protrusion structures 142 of the upper cladding layer 140 and the lower protrusion structures 152 of the emission light collection element 150 are embedded together. In some embodiments, the lower protrusion structures 152 of the emission light collection element 150 may be gratings, and the gratings may be hexagonal frames, but the present disclosure is not limited thereto.

The size of the lower protrusion structures 152 of the emission light collection element 150 are designed to enhance the emission light collection ratio from the samples in the nanowells 160. Since the lower protrusion structures 152 of the emission light collection element 150 may be gratings, a portion of the light may be diffracted towards the light focusing monitor M by the lower protrusion structures 152 of the emission light collection element 150. The lower protrusion structures 152 of the emission light collection element 150 have widths C1, C2, . . . , Cn, and the upper protrusion structures 142 of the upper cladding layer 140 have widths F1, F2, . . . , Fn. n means the number of the upper protrusion structures 142 of the upper cladding layer 140 and the lower protrusion structures 152 of the emission light collection element 150. The nth upper protrusion structures 142 of the upper cladding layer 140 is defined as the nth upper protrusion structures 142 of the upper cladding layer 140 from the nanowells 160. The nth lower protrusion structures 152 of the emission light collection element 150 is defined as the nth lower protrusion structures 152 of the emission light collection element 150 from the nanowells 160. The sum of the widths of the nth upper protrusion structures 142 of the upper cladding layer 140 and the nth lower protrusion structures 152 of the emission light collection element 150 can be referred to as P1, P2, . . . , Pn, in which Pn=Cn+Fn. In some embodiments, the numbers of the upper protrusion structures 142 of the upper cladding layer 140 and the lower protrusion structures 152 of the emission light collection element 150 are between 3 and 30 respectively. In some embodiments, P1≥P2≥ . . . ≥Pn. In some embodiments, widths C1, C2, . . . , Cn, F1, F2, . . . , Fn are not less than 50 nm, such as between 100 nm and 300 nm (and could extend to 50-3000 nm). In some embodiments, the thickness T1 of the lower protrusion structures 152 of the emission light collection element 150 are between 10 nm and 100 nm. In some embodiments, the thickness T2 of the emission light collection element 150 over the upper surface of the upper cladding layer 140 is between 30 nm and 150 nm. In some embodiments, the upper protrusion structures 142 of the upper cladding layer 140 protrude upwards in a direction perpendicular to a bottom surface of the substrate 110.

Figure 3:
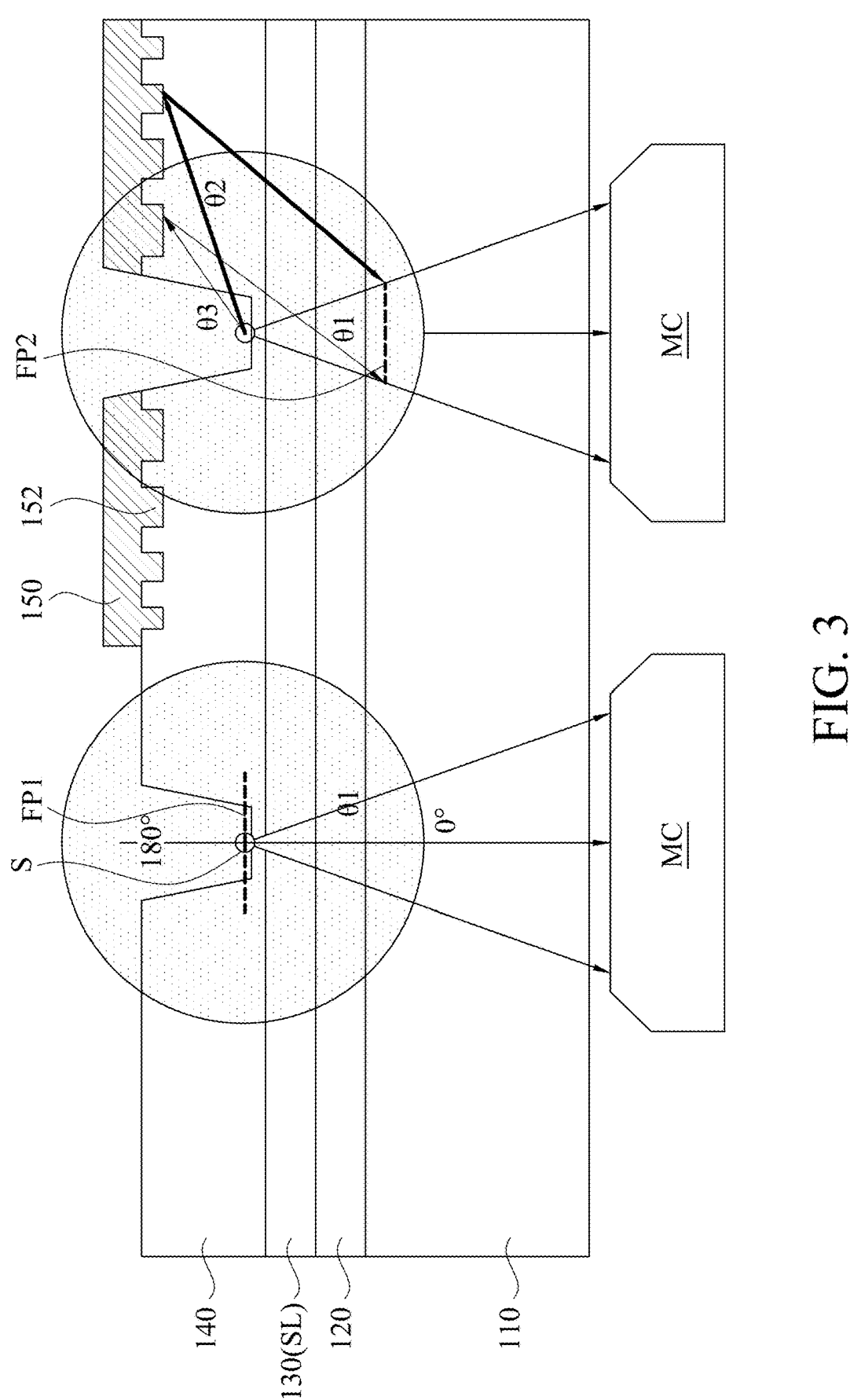
FIG. 3 illustrates a mechanism of increasing the emission light collection ratio by using the emission light collection element.

FIG. 3 illustrates a mechanism of increasing the emission light collection ratio by using the emission light collection element 150. If there is no emission light collection element 150 on the upper cladding layer 140, the sample S in the nanowell 160 serves as the point light source after the sample S is excited, and the location of the sample S forms a focal plane FP1 of the microscope objectives MC. The microscope objectives MC is configured to collect the light emitted from the sample S, and only the emission light from sample S in a cone angle of −θ1 to θ1 can be collected. In the present disclosure, the light emitted from the sample S perpendicular to and toward the substrate 110 is defined as the cone angle of 0. The light emitted from the sample S perpendicular to and far away from the substrate 110 is defined as the cone angle of 180 degrees.

If there is the emission light collection element 150 on the upper cladding layer 140, a portion of the light (in a cone angle between θ2 and θ3 and between −θ2 and −θ3) is diffracted by the lower protrusion structures 152 of the emission light collection element 150, and the light is diffracted towards the light focusing monitor. The diffracted light and the light emitted from the sample S forms a focal plane FP2 below the bottom opening of the nanowell 160. Therefore, if the light focusing monitor is a photodiode, the light focusing monitor may be disposed at the focal plane FP2 to achieve the enhanced emission light collection ratio by not only collecting the light in cone angle of −θ1 to θ1 but also θ2 to ∝3 and −θ2 to −θ3. If the light focusing monitor is defined by the minimum resolution of a lens, the parameters of the monitor may be adjusted to achieve the maximum emission light collection ratio.

Figure 4:
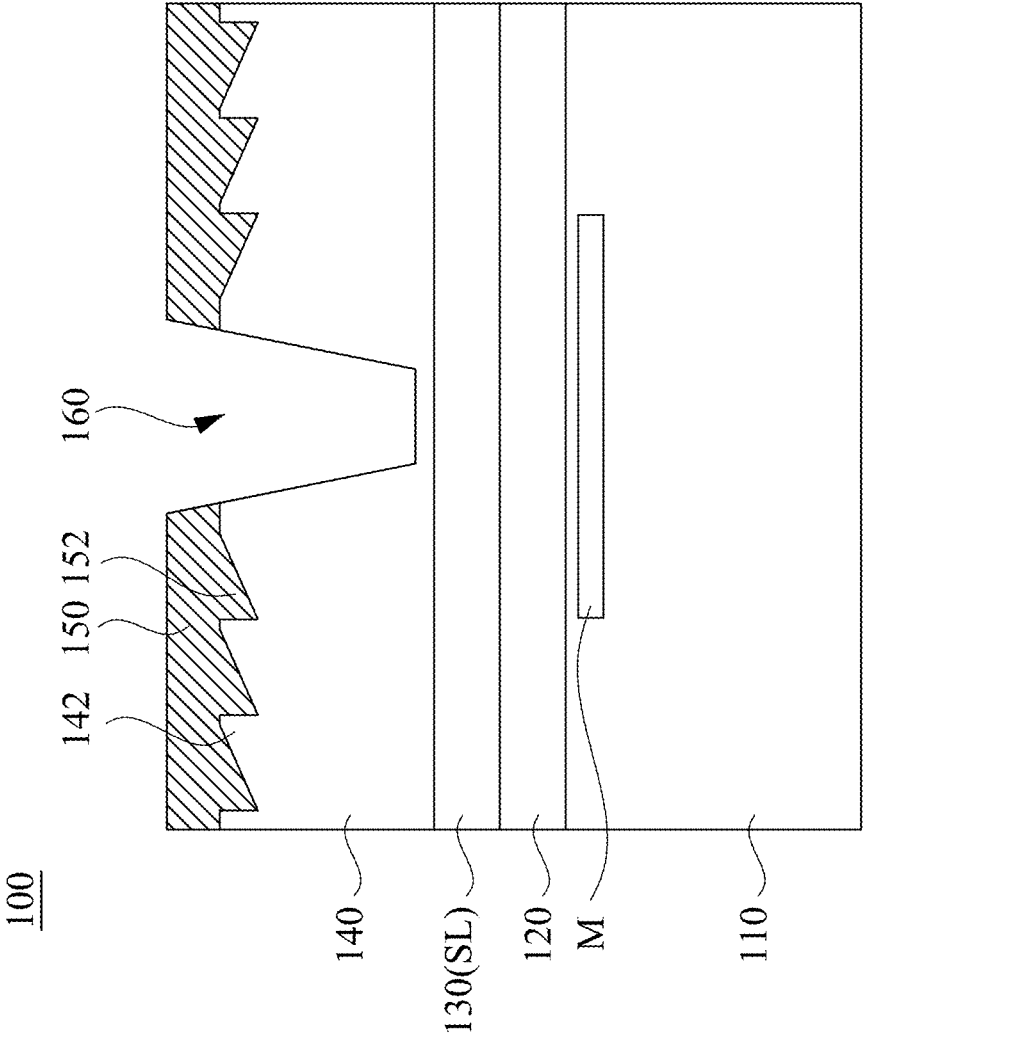
FIG. 4 illustrates a cross-section view of an analytical biochip in some other embodiments of the present disclosure.

FIG. 4 illustrates a cross-section view of an analytical biochip 100 in some other embodiments of the present disclosure. The analytical biochip 100 in FIG. 4 is similar to the analytical biochip 100 in FIG. 2B. The difference is that the upper protrusion structures 142 of the upper cladding layer 140 protrude upwards in a direction inclined to a bottom surface of the substrate 110 in FIG. 4. In FIG. 4, the bottom of the lower protrusion structures 152 of the emission light collection element 150 is a sharp angle. In some embodiments, the upper protrusion structures 142 of the upper cladding layer 140 are inclined toward the nanowell 160.

Figure 5:
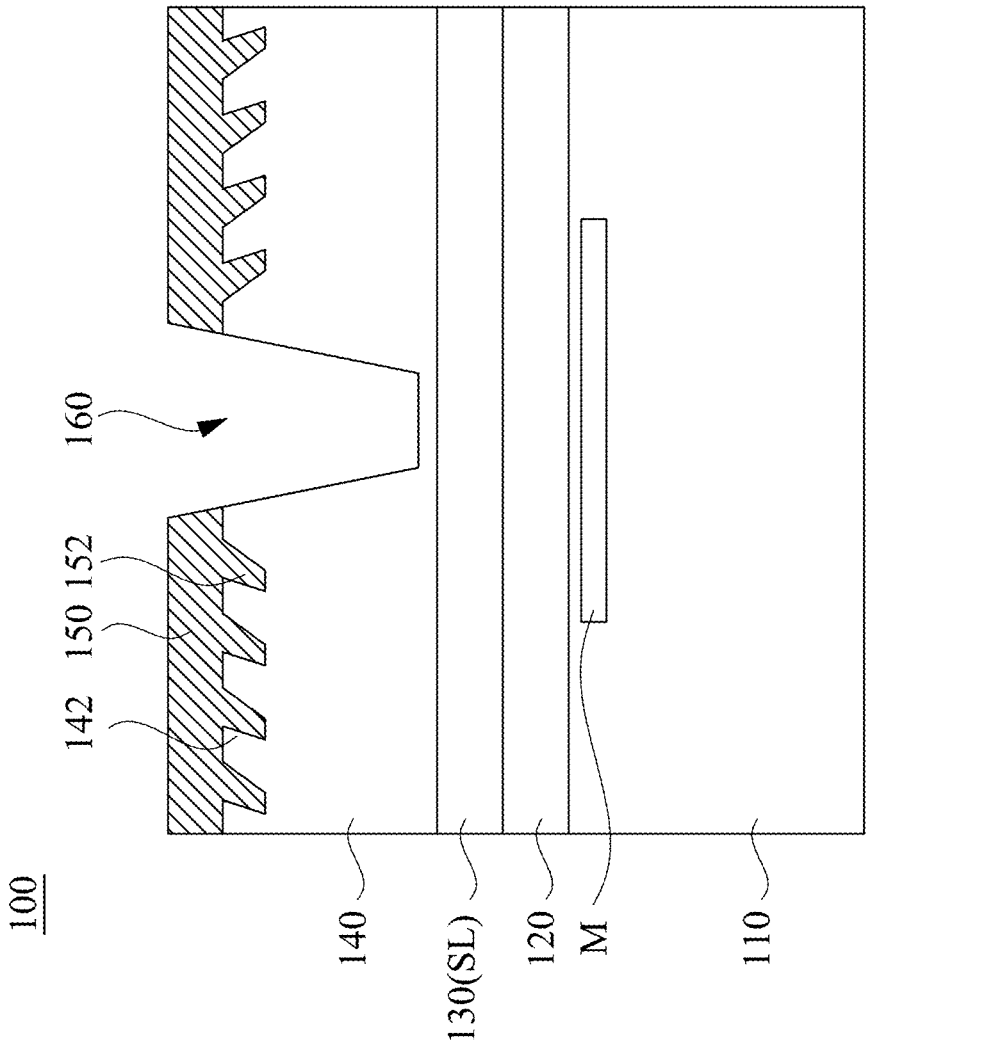
FIG. 5 illustrates a cross-section view of an analytical biochip in some other embodiments of the present disclosure.

FIG. 5 illustrates a cross-section view of an analytical biochip 100 in some other embodiments of the present disclosure. The analytical biochip 100 in FIG. 5 is similar to the analytical biochip 100 in FIG. 4. The difference is that the bottom of the lower protrusion structures 152 of the emission light collection element 150 is a plane.

Figure 6:
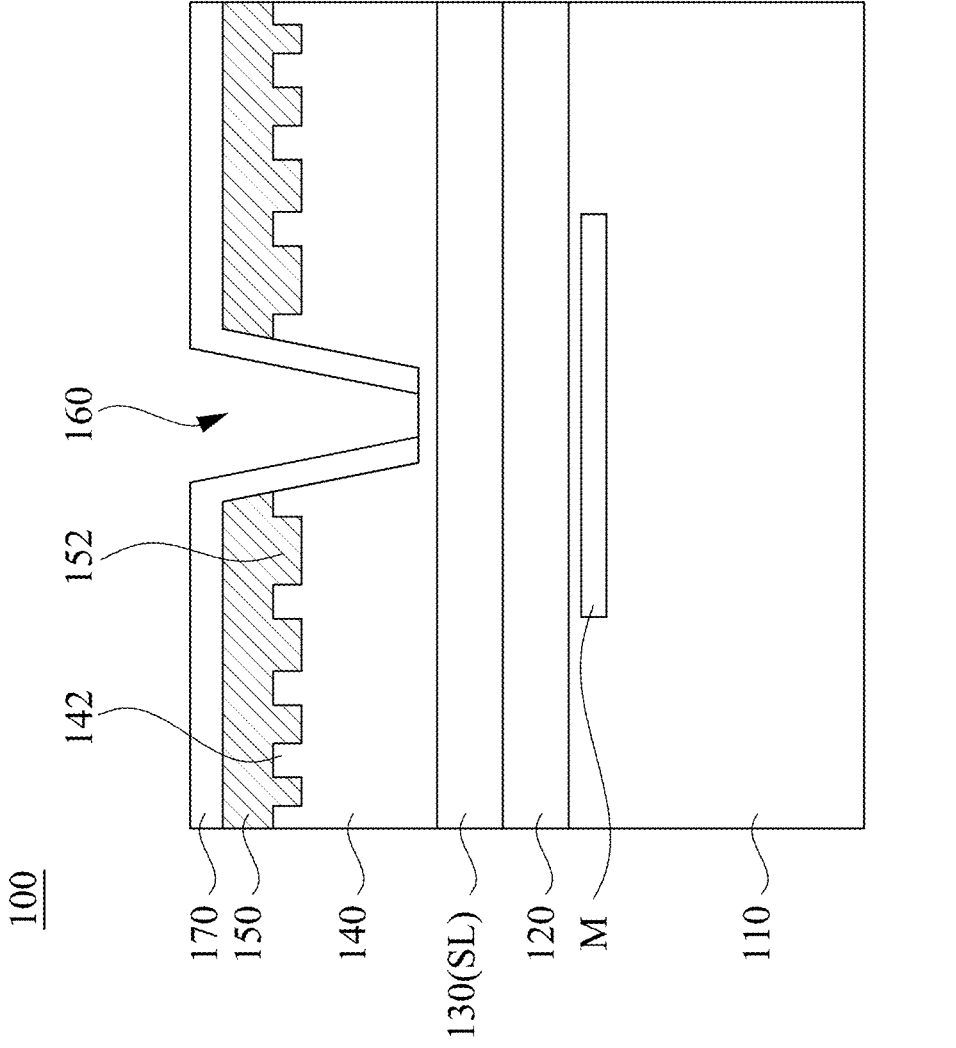
FIG. 6 illustrates a cross-section view of an analytical biochip in some other embodiments of the present disclosure.

FIG. 6 illustrates a cross-section view of an analytical biochip 100 in some other embodiments of the present disclosure. The analytical biochip 100 further includes a sacrificial layer 170 conformally disposed over the emission light collection element 150 and sidewalls of the nanowell 160. The sacrificial layer 170 also exposes the bottom opening of the nanowell 160. The sacrificial layer 170 is used for restrict the reaction site of the samples in the nanowell 160. The detailed description of the sacrificial layer 170 will be mentioned later discussion. In some embodiments, the sacrificial layer 170 is made of dielectric layer such as $Al_2O_3$.

Figure 7:
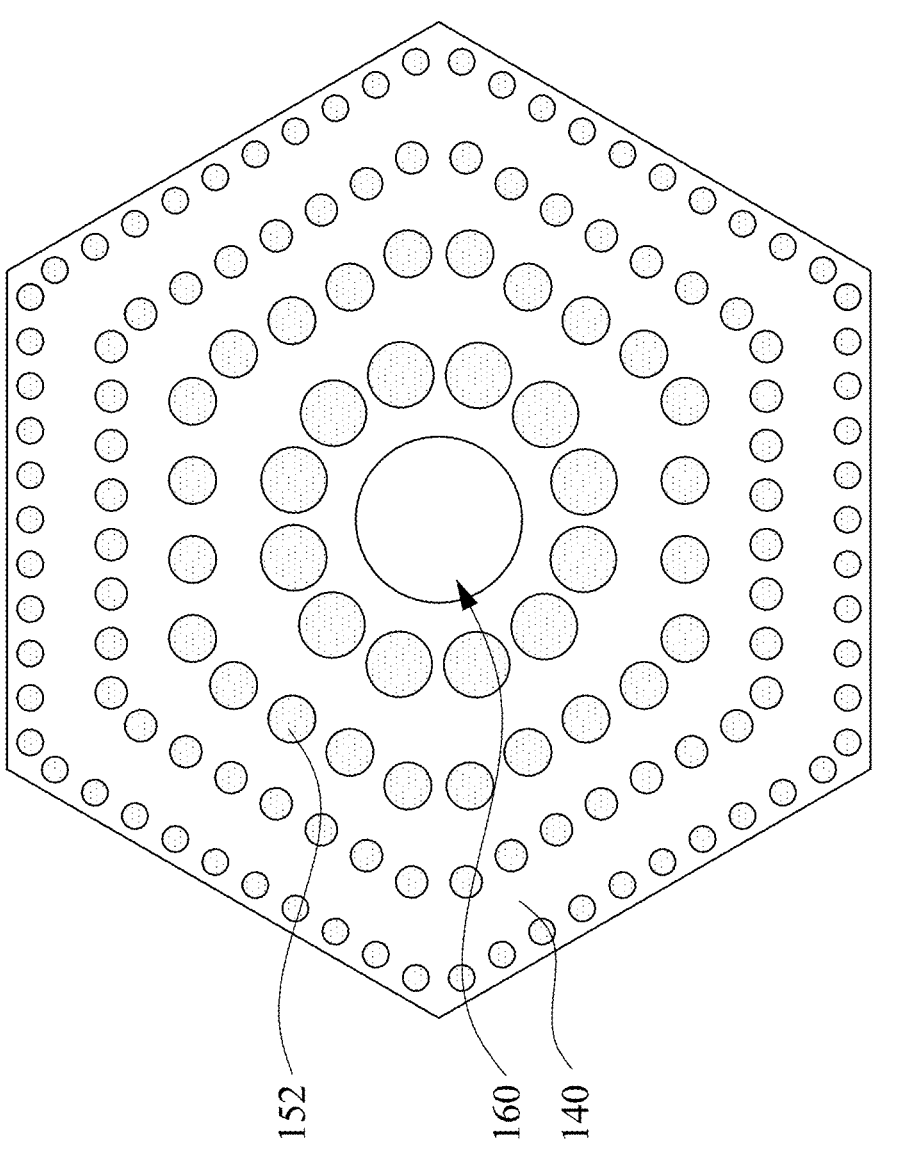
FIG. 7 illustrates a top view of an analytical biochip in some other embodiments of the present disclosure.

FIG. 7 illustrates a top view of an analytical biochip 100 in some other embodiments of the present disclosure. The analytical biochip 100 in FIG. 7 is similar to the analytical biochip 100 in FIG. 2A. The difference is that the emission light collection element 150 forms a metasurface in FIG. 7, and the lower protrusion structures 152 of the emission light collection element 150 are a plurality of meta-atoms of the metasurface. In some embodiments, the meta-atoms may be cylinders, but the present disclosure is not limited thereto.

FIGS. 8-17 illustrate cross-section views of manufacturing an analytical biochip 100 taken along the line A-A' in FIG. 1A in some embodiments of the present disclosure.

Figure 8:
FIGS. 8-17 illustrate cross-section views of manufacturing an analytical biochip in some embodiments of the present disclosure.

Referring to FIG. 8, a lower cladding layer 120 is formed over a substrate 110, a waveguide 130 is formed over the lower cladding layer 120, and an upper cladding layer 140 is formed over the waveguide 130. The waveguide 130 includes a grating coupler 132. In some embodiments, as shown in FIG. 8, the grating coupler 132 may be formed by forming a grating structure 133A protruding towards the upper cladding layer 140. The grating structure 133A may be formed by patterning the upper surface of a dielectric layer which is used for forming the waveguide 130 before forming the upper cladding layer 140. The other portion of the dielectric layer which is not patterned forms the guiding portion SL of the waveguide 130.

Figure 9:
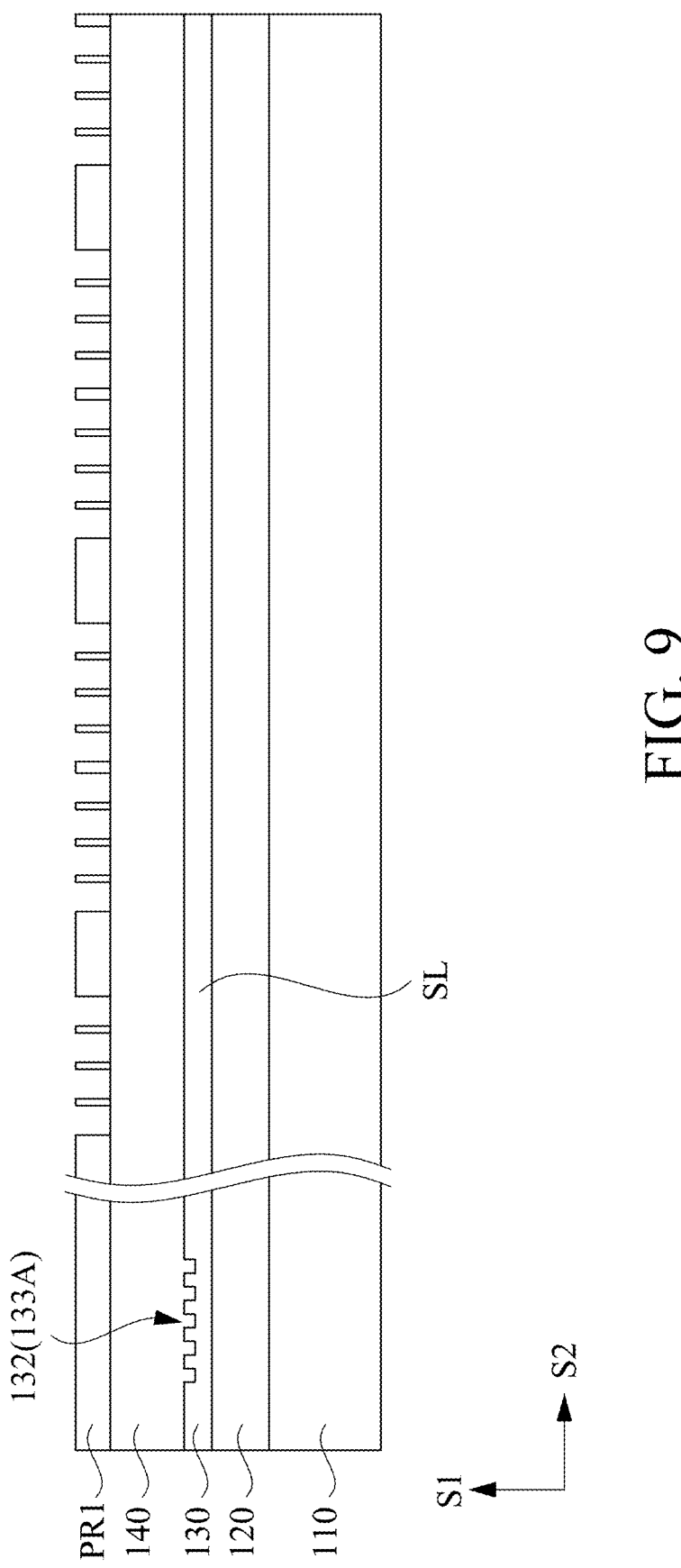
Figure 10:
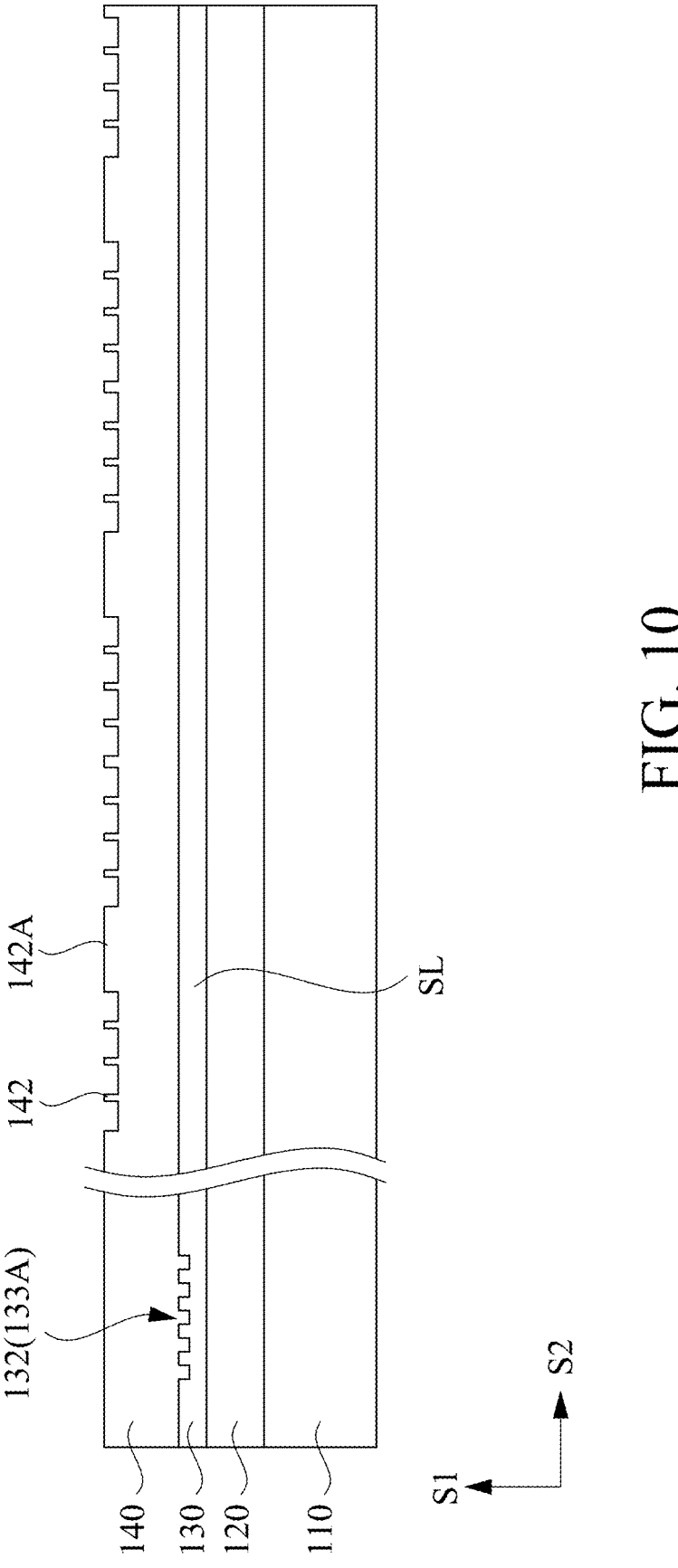

Referring to FIG. 9, a patterned photoresist layer PR1 is formed over the upper cladding layer 140. Subsequently, referring to FIG. 10, the upper cladding layer 140 is patterned to form upper protrusion structures 142 at an upper surface of the upper cladding layer 140. Specifically, the upper protrusion structures 142 is formed by etching the upper surface of the upper cladding layer 140 by using the patterned photoresist layer PR1 as etching mask. After forming the upper protrusion structures 142, the patterned photoresist layer PR1 is removed. In some embodiments, some of the upper protrusion structures 142 are formed larger (such as upper protrusion structures 142A), and nanowells will be formed at the location of the larger upper protrusion structures 142A. In some embodiments, the upper protrusion structures 142A have the same sizes throughout the whole analytical biochip 100.

Figure 11:
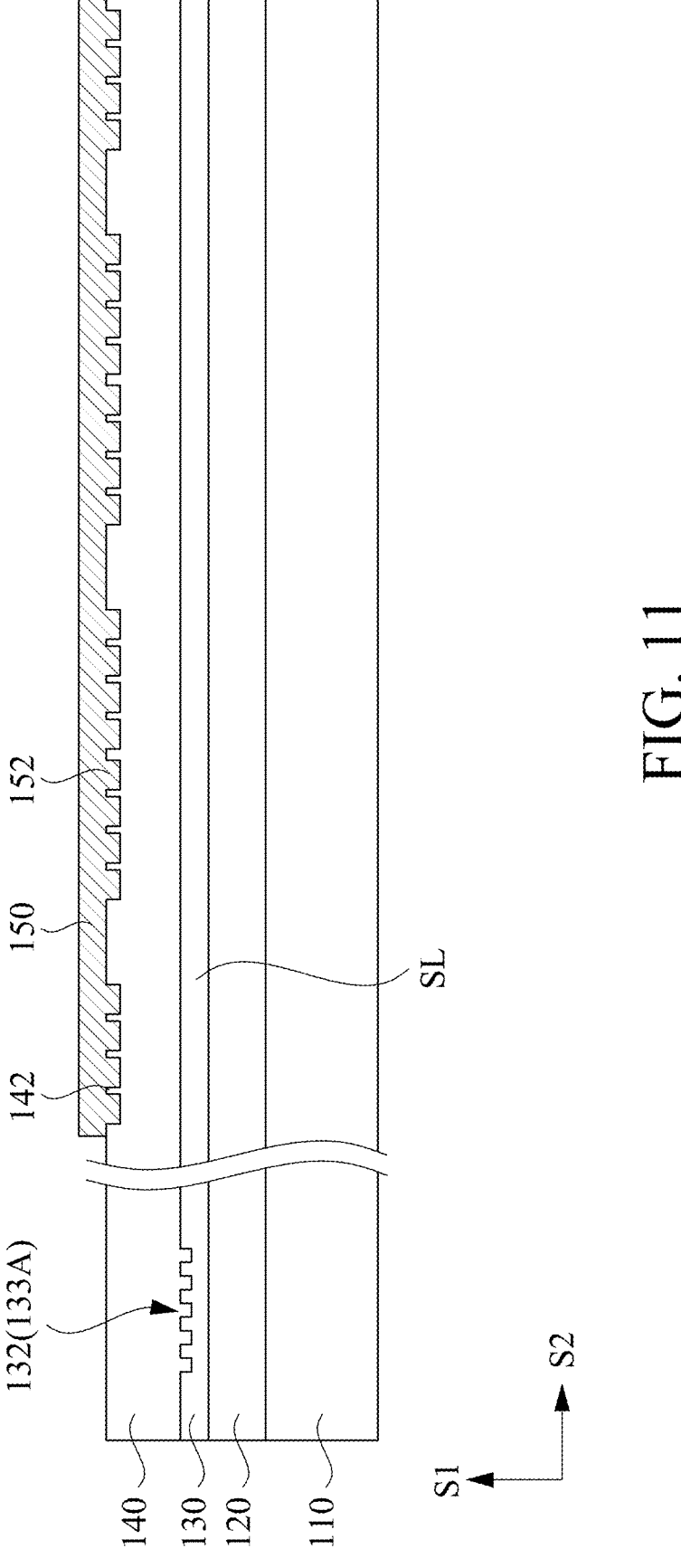

Referring to FIG. 11, an emission light collection element 150 covering the upper protrusion structures 142 is formed, in which portions of the emission light collection element 150 (i.e. lower protrusion structures 152) extends into the upper cladding layer 140, and the emission light collection element 150 is made of metal. Specifically, the emission light collection element 150 may be formed by depositing a metal layer over the upper protrusion structures 142 of the upper cladding layer 140. A polish process may be optionally performed to polish the top surface of the metal layer. The overall thickness of the emission light collection element 150 is greater than the thickness of the upper protrusion structures 142 of the upper cladding layer 140. That is, the upper protrusion structures 142 of the upper cladding layer 140 are embedded in the emission light collection element 150.

Figure 12:
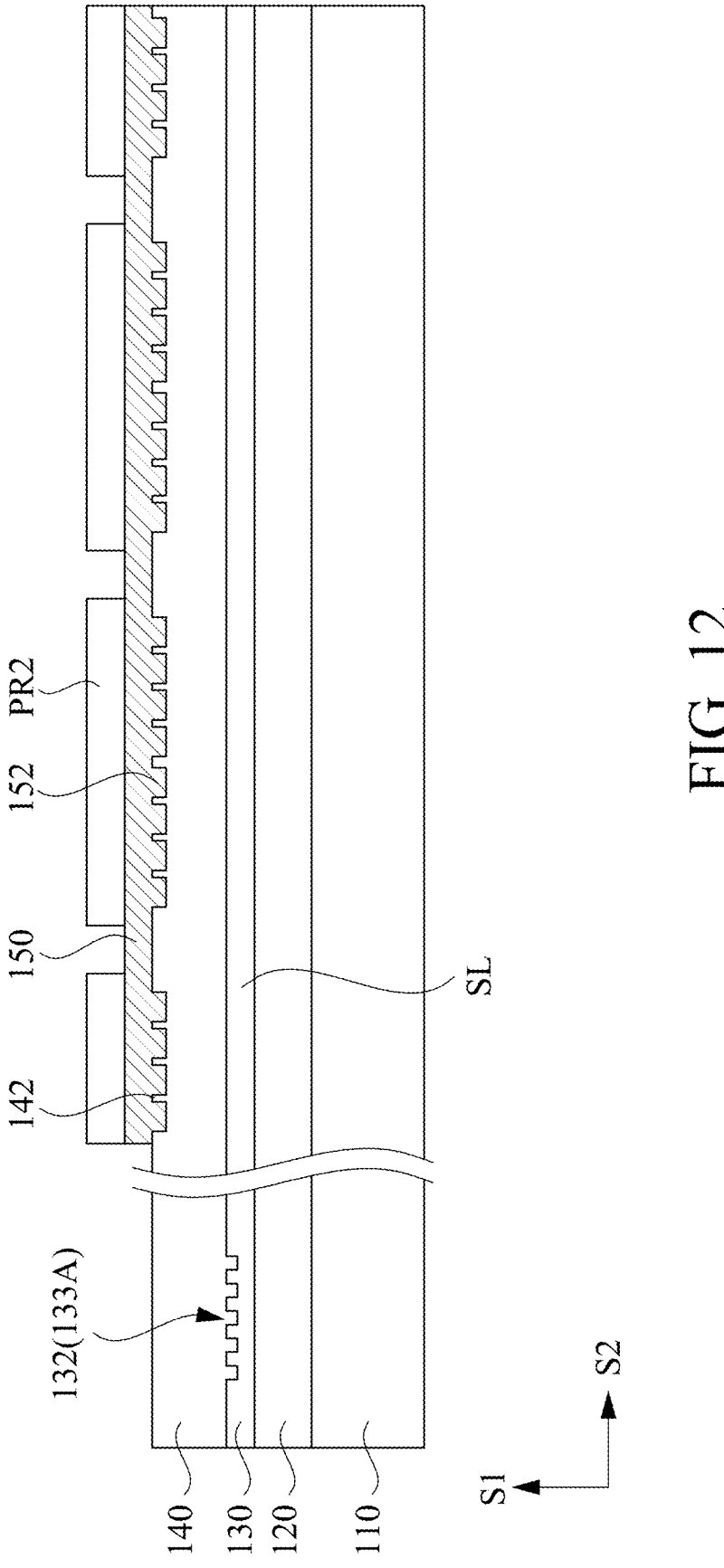
Figure 13:
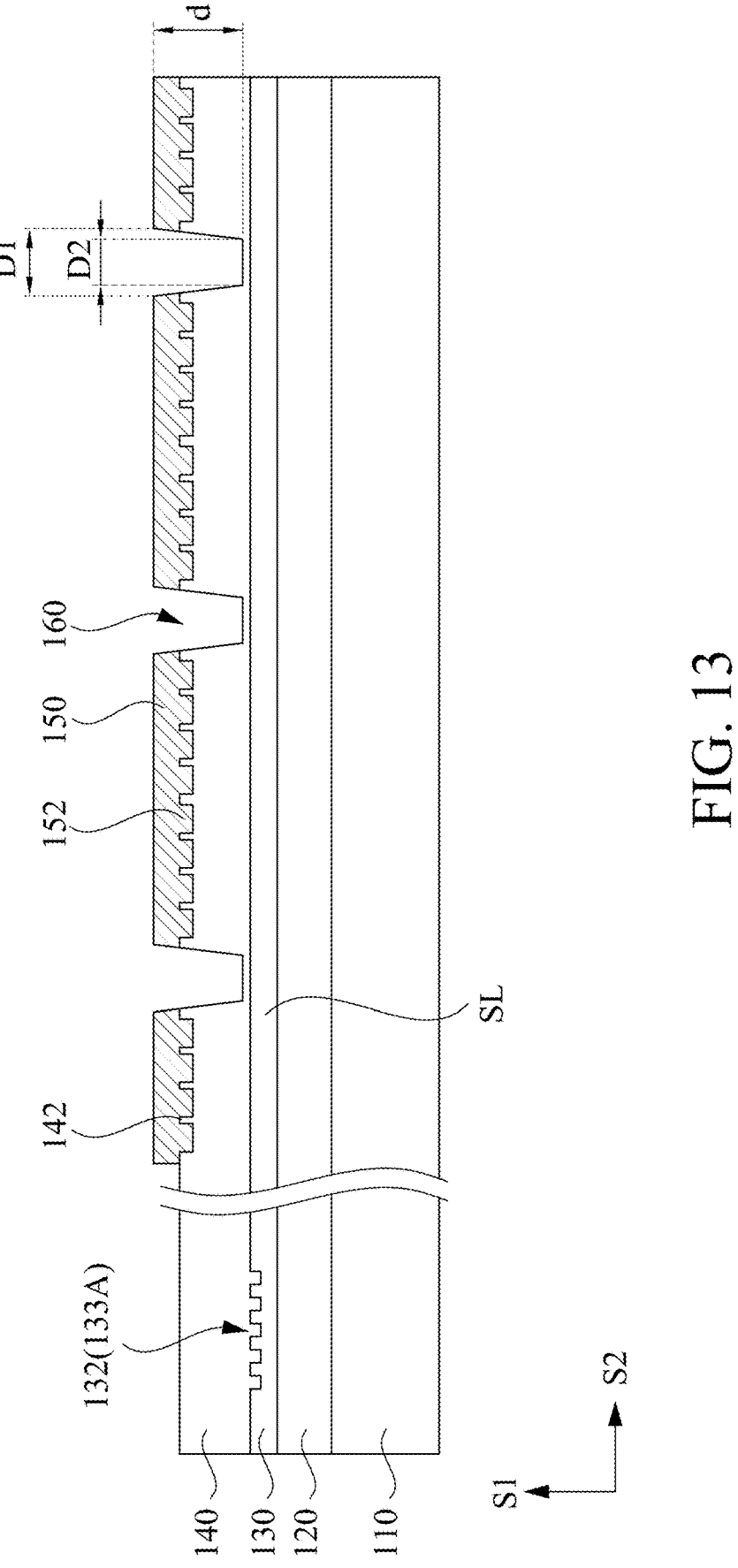

Referring to FIG. 12, a patterned photoresist layer PR2 is formed over the emission light collection element 150. In some embodiments, the patterned photoresist layer PR2 has openings with identical diameters. Subsequently, referring to FIG. 13, a plurality of nanowells 160 penetrating the emission light collection element 150 and in the upper cladding layer 140 are formed. Specifically, the nanowells 160 are formed by etching the emission light collection element 150 and the upper cladding layer 140 by using the patterned photoresist layer PR2 as etching mask. The nanowells 160 have top openings with identical diameters D1 and bottom opening with identical diameters D2. The depth d of the nanowells 160 is controlled, so that the bottom openings of the nanowells 160 do not reach the waveguide 130. Moreover, the depth d of the nanowells 160 is greater than the diameter D1 of the nanowells 160. In each of the nanowells 160, an area of a top opening of the nanowell 160 is a first area A1, a sum of an area of a sidewall of the nanowell 160 and an area of a bottom opening of the nanowell 160 is a second area A2, and the first area A1 is less than half of the second area A2. In some embodiments where the nanowell 160 is a portion of a cone, the first area A1 and the second are A2 is represented by the following relational expression:

$$A1 = 0.25 \times \pi \times D1^2$$

$$A2 = 0.25 \times \pi \times D2^2 + 0.5 \times \pi \times (D1 + D2) \times \sqrt{(D1 - D2)^2 + d^2}$$

After forming the nanowells 160, the patterned photoresist layer PR2 is removed. The nanowells 160 and the emission light collection element 150 are not directly formed over the grating coupler 132. Thus, the grating coupler 132 will be omitted in the following figures, such as FIGS. 14-24, and only the portion of the guiding portion SL of the waveguide 130 below the nanowells 160 is illustrated.

Figure 14:
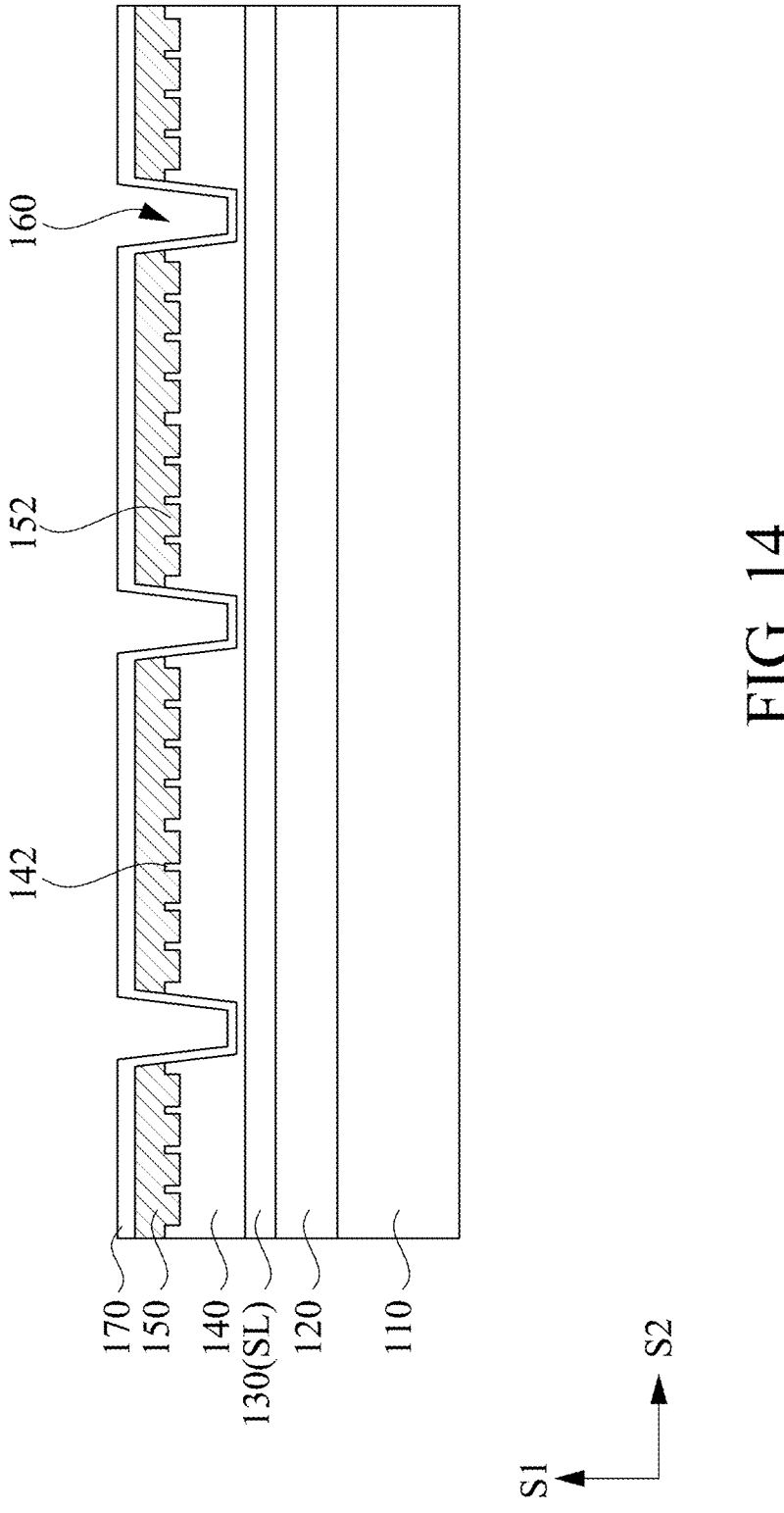

Referring to FIG. 14, a sacrificial layer 170 is formed conformally over the emission light collection element 150 and the nanowells 160. The sacrificial layer 170 may be formed by sputtering or E-gun. When the first area of the nanowells 160 is less than half of the second area of the nanowells 160 (as discussed in FIG. 13), or the depth d of the nanowells 160 is greater than the diameter D1 of the nanowells 160, during forming the sacrificial layer 170, the thickness of the sacrificial layer 170 at bottom openings of the nanowells 160 is naturally less than the thickness of the sacrificial layer 170 over the emission light collection element 150. In some embodiments, the sacrificial layer 170 may be made of insulating material, such as $Al_2O_3$.

Figure 15:
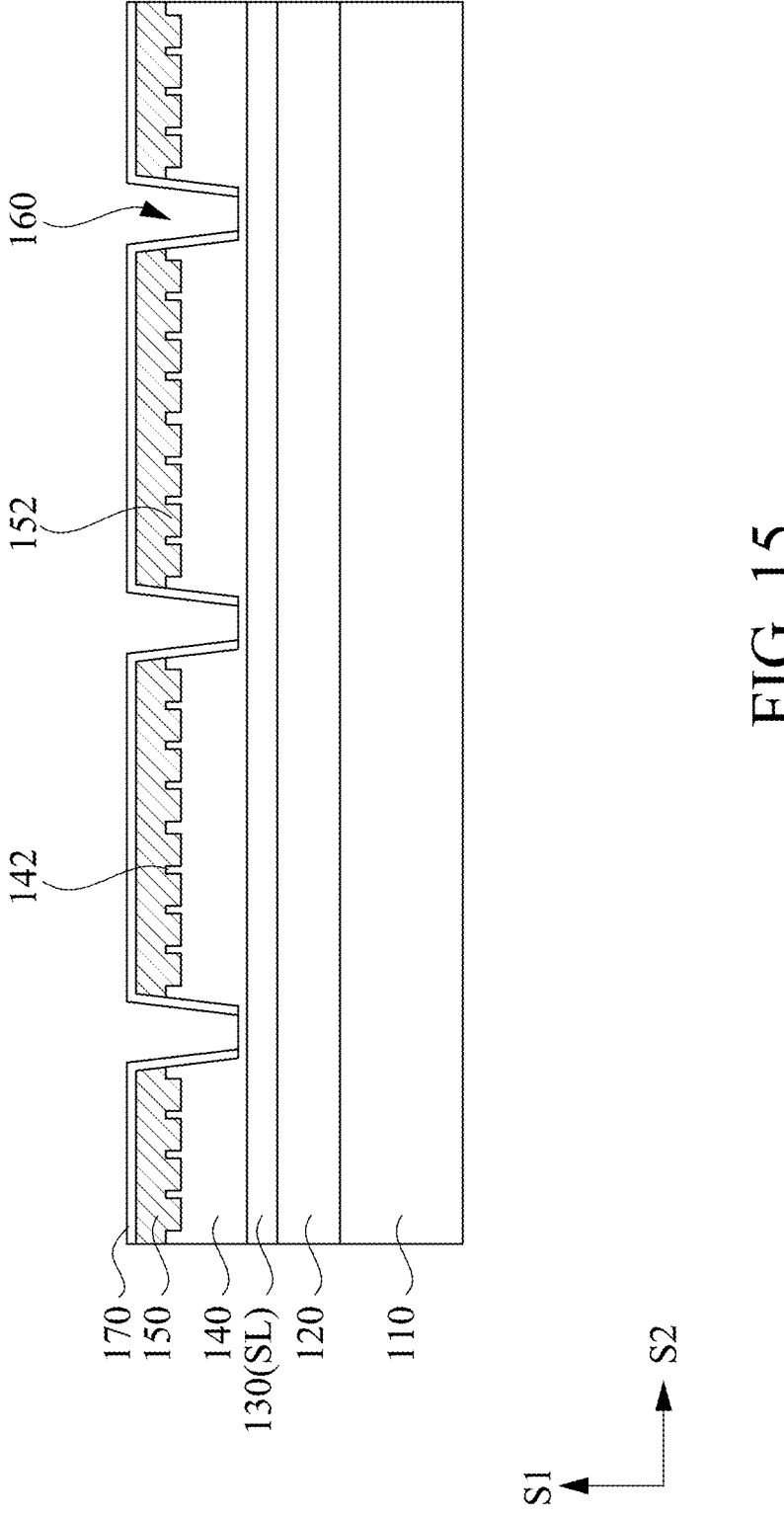

Referring to FIG. 15, the sacrificial layer 170 at the bottom opening of the nanowells 160 is removed. Since the thickness of the sacrificial layer 170 at bottom openings of the nanowells 160 is less than the thickness of the sacrificial layer 170 over the emission light collection element 150, the sacrificial layer 170 still covers the emission light collection element 150 after the sacrificial layer 170 at the bottom opening of the nanowells 160 is removed. In some embodiments, the sacrificial layer 170 at the bottom opening of the nanowells 160 is removed by dry etching.

Figure 16:
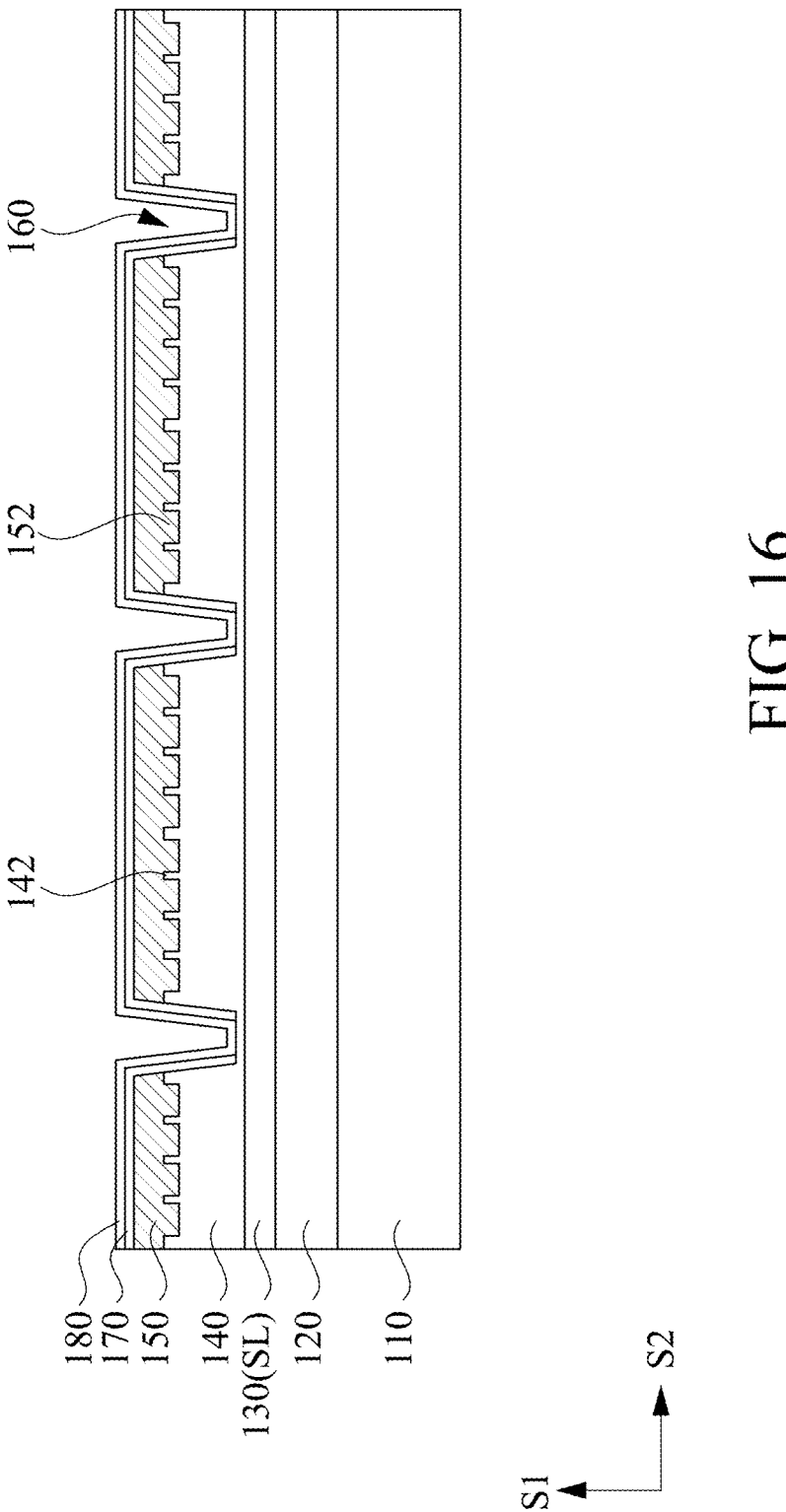

Referring to FIG. 16, an adherent layer 180 is formed conformally over the sacrificial layer 170 and the bottom openings of the nanowells 160. In some embodiments, the adherent layer 180 may be made of silane. In some embodiments, before forming the adherent layer 180, the analytical biochip 100 is preserved from humidity and oxygen. For example, adherent layer 180 is formed under vacuum condition.

Figure 17:
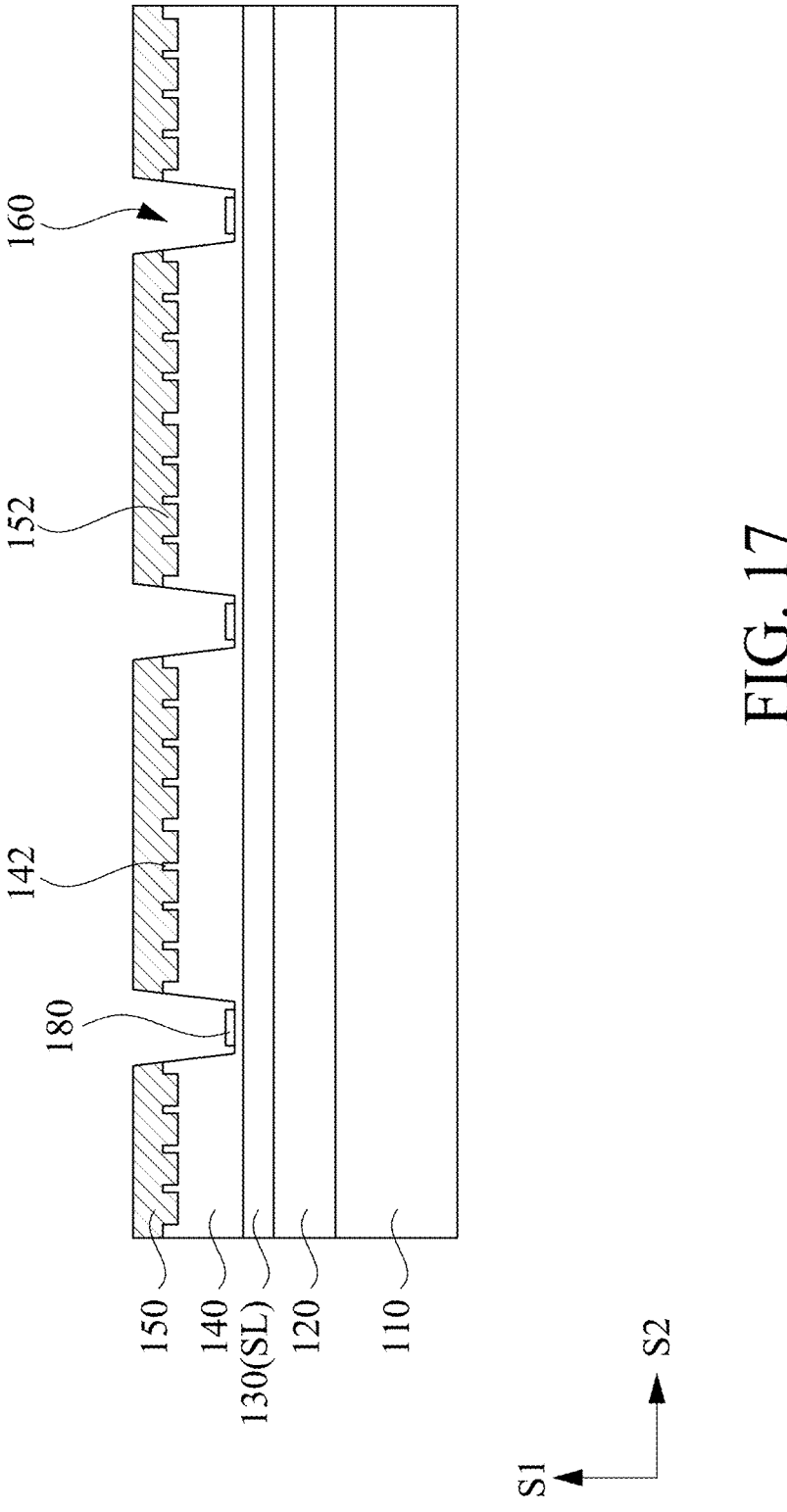

Referring to FIG. 17, the sacrificial layer 170 and the adherent layer 180 conformally over the sacrificial layer 170 is removed, and the adherent layer 180 conformally over the bottom opening of the nanowells 160 is in place. In some embodiments, the sacrificial layer 170 is removed by the acidic or alkaline solution, and the adherent layer 180 conformally over the sacrificial layer 170 is removed at the same time. The adherent layer 180 conformally over the bottom opening of the nanowells 160 provides the site of biochemical reaction. For example, samples may be loaded and immobilized at the adherent layer 180. Therefore, the samples may be selectively immobilized at the adherent layer 180, and will not be immobilized at other locations in the nanowells 160.

Figure 18:
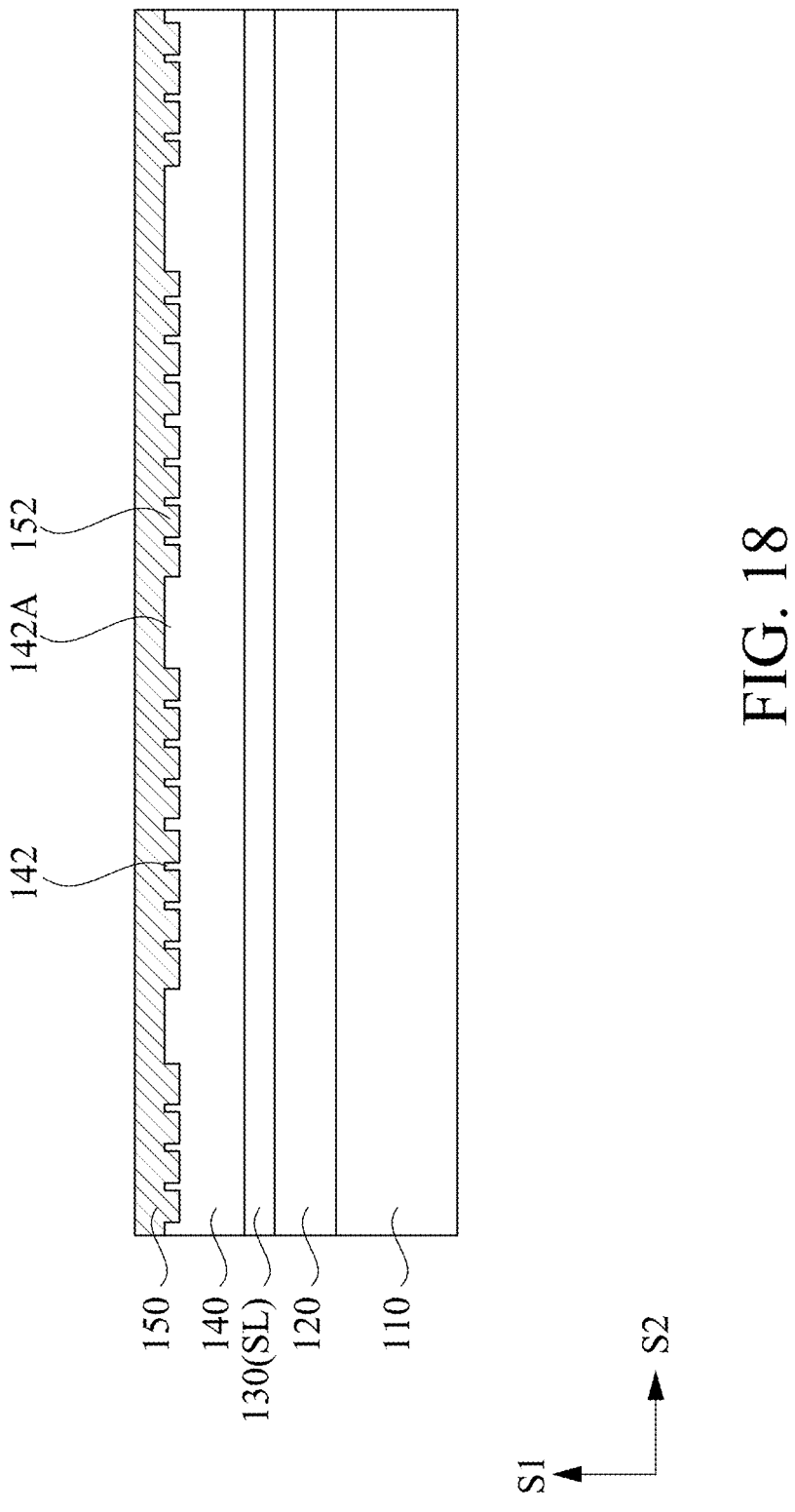
FIGS. 18-20 illustrate cross-section views of manufacturing an analytical biochip in some other embodiments of the present disclosure.
Figure 19:
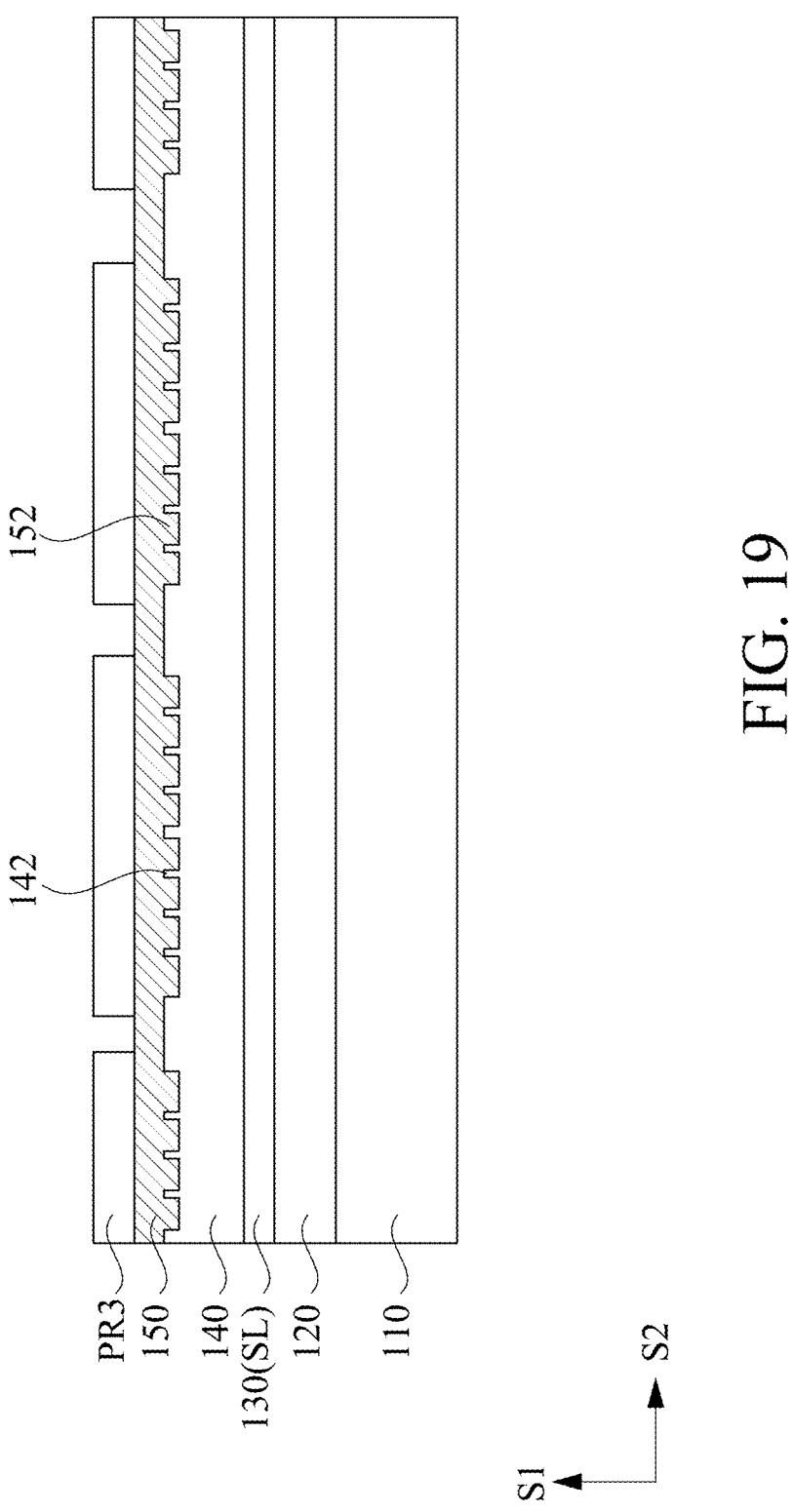
Figure 20:
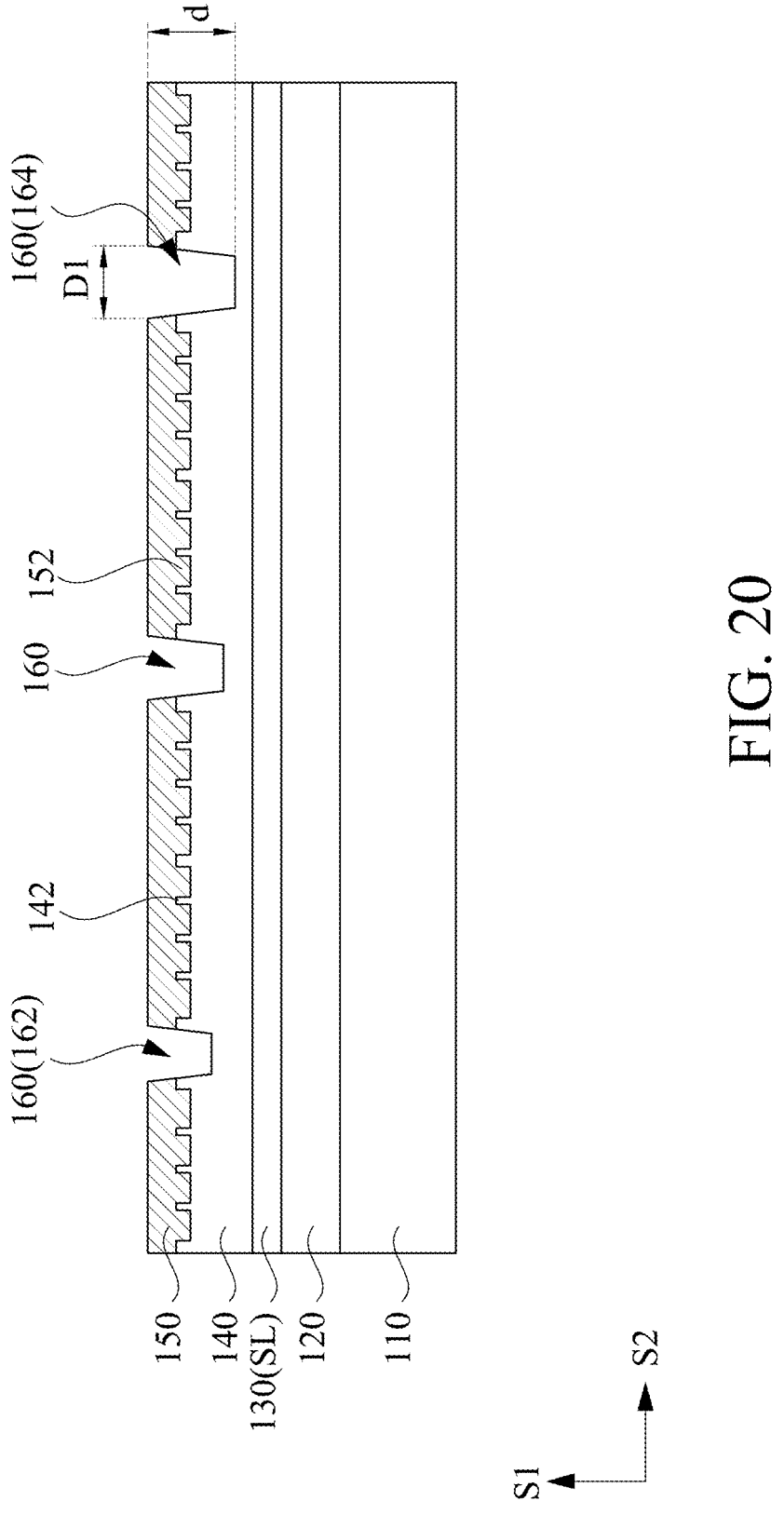

FIGS. 18-20 illustrate cross-section views of manufacturing an analytical biochip 100 taken along the line A-A' in FIG. 1A in some other embodiments of the present disclosure. Referring to FIG. 18, an emission light collection element 150 covering the upper protrusion structures 142 of the upper cladding layer 140 is formed after the process in FIG. 10. The process in FIG. 18 is similar to the process in FIG. 11. The difference is that the size of the upper protrusion structures 142A in FIG. 18 increase in the second direction S2 as being farther from the grating coupler. For example, if the grating coupler is at the left side of FIG. 18, the size of the upper protrusion structures 142A in FIG. 18 increase in the direction towards the right side. To simplify the figure, it is also assumed that the grating coupler is at the left side of the following figures (such as FIGS. 19-24). In FIG. 18, the upper cladding layer 140 has a uniform thickness between 200 nm and 2000 nm.

Referring to FIG. 19, a patterned photoresist layer PR3 is formed over the emission light collection element 150, in which the patterned photoresist layer PR3 includes a plurality of openings, and diameters of the openings of the patterned photoresist layer PR3 increase in the second direction S2 as being farther from the grating coupler. In some embodiments, the diameters of the openings of the patterned photoresist layer PR3 are between 100 nm and 1000 nm.

Referring to FIG. 20, the emission light collection element 150 and the upper cladding layer 140 is etched by the patterned photoresist layer PR3. Due to the loading effect, the emission light collection element 150 and the upper cladding layer 140 exposed by the larger opening are etched by faster etching rate, and the emission light collection element 150 and the upper cladding layer 140 exposed by the smaller opening are etched by slower etching rate. Therefore, the depths d of the nanowells 160 increase in the second direction S2 as being farther from the grating coupler, and the diameters D1 of the nanowells 160 increase in the second direction S2 as being farther from the grating coupler. That is, the distances between bottom openings of the nanowells 160 and an upper surface of the guiding portion SL of the waveguide 130 decrease in the second direction S2 as being farther from the grating coupler. Stated in another way, the nanowells 160 include a first nanowell 162 and a second nanowell 164. When viewed in a cross section cut along the line A-A' in FIG. 1A and the first direction S1 and that intersects the grating coupler 132 and the first and second nanowells 162 and 164 as shown in FIG. 20, the second nanowell 164 is farther from the grating coupler 132 than the first nanowell 162 in the second direction S2 perpendicular to the first direction S1. The distance between the bottom opening of the second nanowell 164 and an upper surface of the guiding portion SL of the waveguide 130 is less than the distance between the bottom opening of the first nanowell 162 and the upper surface of the guiding portion SL of the waveguide 130. The diameter D1 of the top opening of the second nanowell 164 is greater than the diameter D1 of the top opening of the first nanowell 162. In some embodiments, the distances between bottom openings of the nanowells 160 and an upper surface of the guiding portion SL of the waveguide 130 are greater than 0 nm and less than 200 nm. Subsequently, the patterned photoresist layer PR3 is removed. In some embodiments, after the process in FIG. 20, the process in FIGS. 14-17 may be continued.

Figure 21:
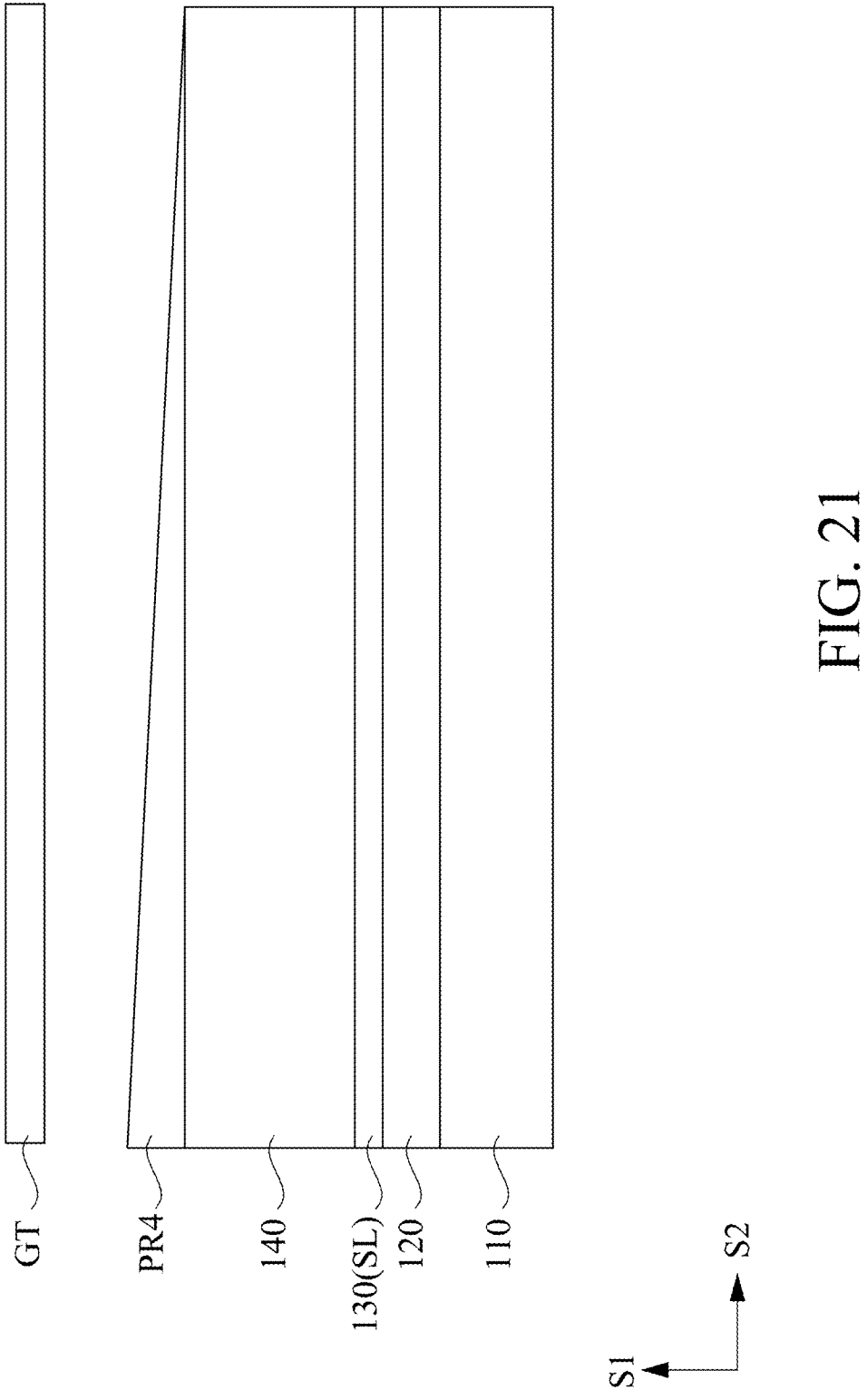
FIGS. 21-24 illustrate cross-section views of manufacturing an analytical biochip in some other embodiments of the present disclosure.

FIGS. 21-24 illustrate cross-section views of manufacturing an analytical biochip 100 taken along the line A-A' in FIG. 1A in some other embodiments of the present disclosure. Referring to FIG. 21, after forming the upper cladding layer 140 in FIG. 8, a patterned photoresist layer PR4 is formed over the upper cladding layer 140 by using a gray-tone mask GT, in which a thickness of the patterned photoresist layer PR4 decreases in the second direction S2 as being farther from the grating coupler.

Figure 22:
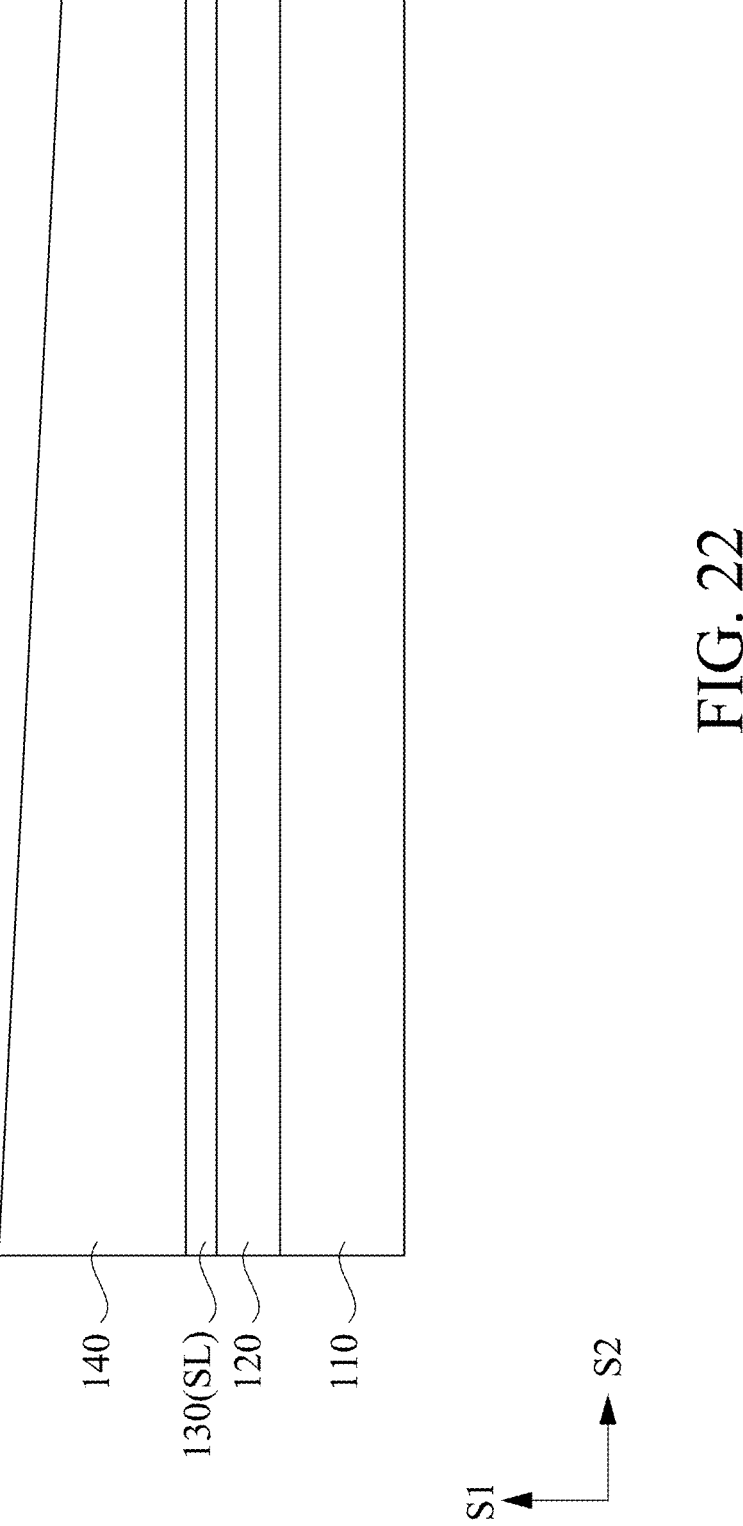

Referring to FIG. 22, the upper cladding layer 140 is etched by using the patterned photoresist layer PR4 as etching mask, such that a thickness of the upper cladding layer 140 decreases in the second direction S2 as being farther from the grating coupler. During the etching process, the patterned photoresist layer PR4 is etched, the upper cladding layer 140 covered by the thinner patterned photoresist layer PR4 is etched deeply, and the upper cladding layer 140 covered by the thicker patterned photoresist layer PR4 is etched shallowly. Since the thickness of the patterned photoresist layer PR4 decreases in the second direction S2 as being farther from the grating coupler, the thickness of the upper cladding layer 140 also decreases in the second direction S2 as being farther from the grating coupler after being etched. Subsequently, the patterned photoresist layer PR4 is removed. In some embodiments, the thickness of the upper cladding layer 140 is not less than 200 nm.

Figure 23:
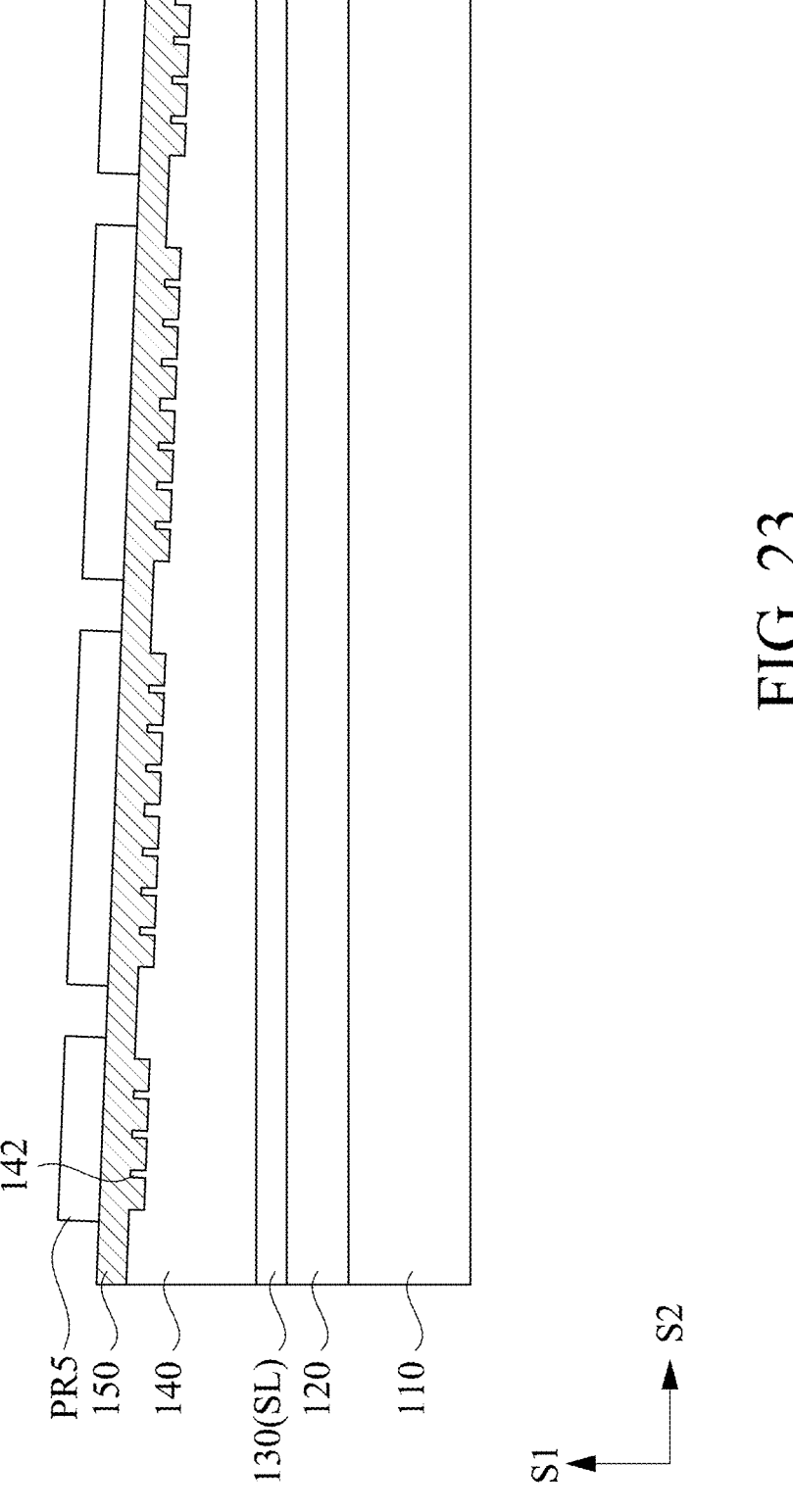

Referring to FIG. 23, an emission light collection element 150 covering the upper protrusion structures 142 of the upper cladding layer 140 is formed, and a patterned photoresist layer PR5 is formed over the emission light collection element 150. The patterned photoresist layer PR5 has openings with identical diameter.

Figure 24:
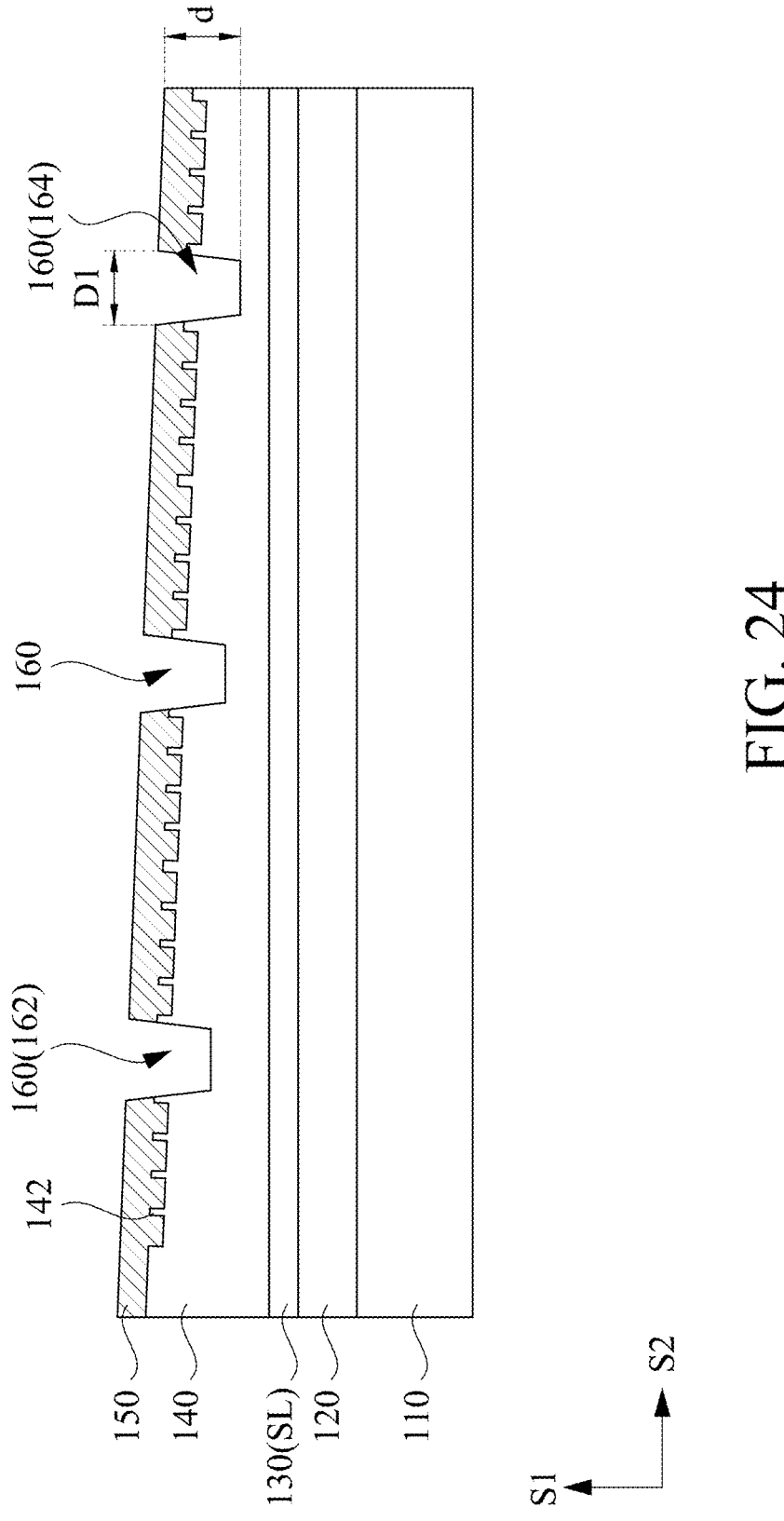

Referring to FIG. 24, the emission light collection element 150 and the upper cladding layer 140 are etched by the patterned photoresist layer PR5. Since the patterned photoresist layer PR5 has the openings with identical diameter, the emission light collection element 150 and the upper cladding layer 140 exposed by the openings of the patterned photoresist layer PR5 are etched by the same rate (i.e. the depths d of the nanowells 160 are identical), and the diameters D1 of the top openings of the nanowells 160 are identical. Due to the decrease of the thickness of the upper cladding layer 140, the distances between bottom openings of the nanowells 160 and an upper surface of the guiding portion SL of the waveguide 130 decrease in the second direction S2 as being farther from the grating coupler. Stated another way, the nanowells 160 include a first nanowell 162 and a second nanowell 164. When viewed in a cross section cut along the line A-A' in FIG. 1A and the first direction S1 and that intersects the grating coupler 132 and the first and second nanowells 162 and 164 as shown in FIG. 24, the second nanowell 164 is farther from the grating coupler 132 than the first nanowell 162 in the second direction S2 perpendicular to the first direction S1. The distance between the top opening of the second nanowell 164 and the upper surface of the guiding portion SL of the waveguide 130 is less than the distance between the top opening of the first nanowell 162 and the upper surface of the guiding portion SL or the channel of the waveguide, and the diameter D1 of the top opening of the second nanowell 164 and the diameter D1 of the top opening of the first nanowell 162 are identical. In some embodiments, the distances between bottom openings of the nanowells 160 and an upper surface of the guiding portion SL of the waveguide 130 are greater than 0 nm and less than 200 nm. Subsequently, the patterned photoresist layer PR5 is removed.

The embodiments in FIGS. 20 and 24 may be used for compensate the propagation loss of the excitation energy. Specifically, the excitation energy is propagated from the grating coupler (assumed the grating coupler is at the left side of FIGS. 20 and 24), the propagation loss of the excitation energy may lead to less excitation energy propagated to the nanowells 160 as being farther from the grating coupler. To compensate the propagation loss of the excitation energy, the distances between bottom openings of the nanowells 160 and an upper surface of the guiding portion SL of the waveguide 130 decrease in the second direction S2 as being farther from the grating coupler, so that the bottom openings of the nanowells 160 (i.e. the reaction site of the analytical biochip 100) throughout the whole analytical biochip 100 may receive similar amount of the excitation energy.

Figure 25:
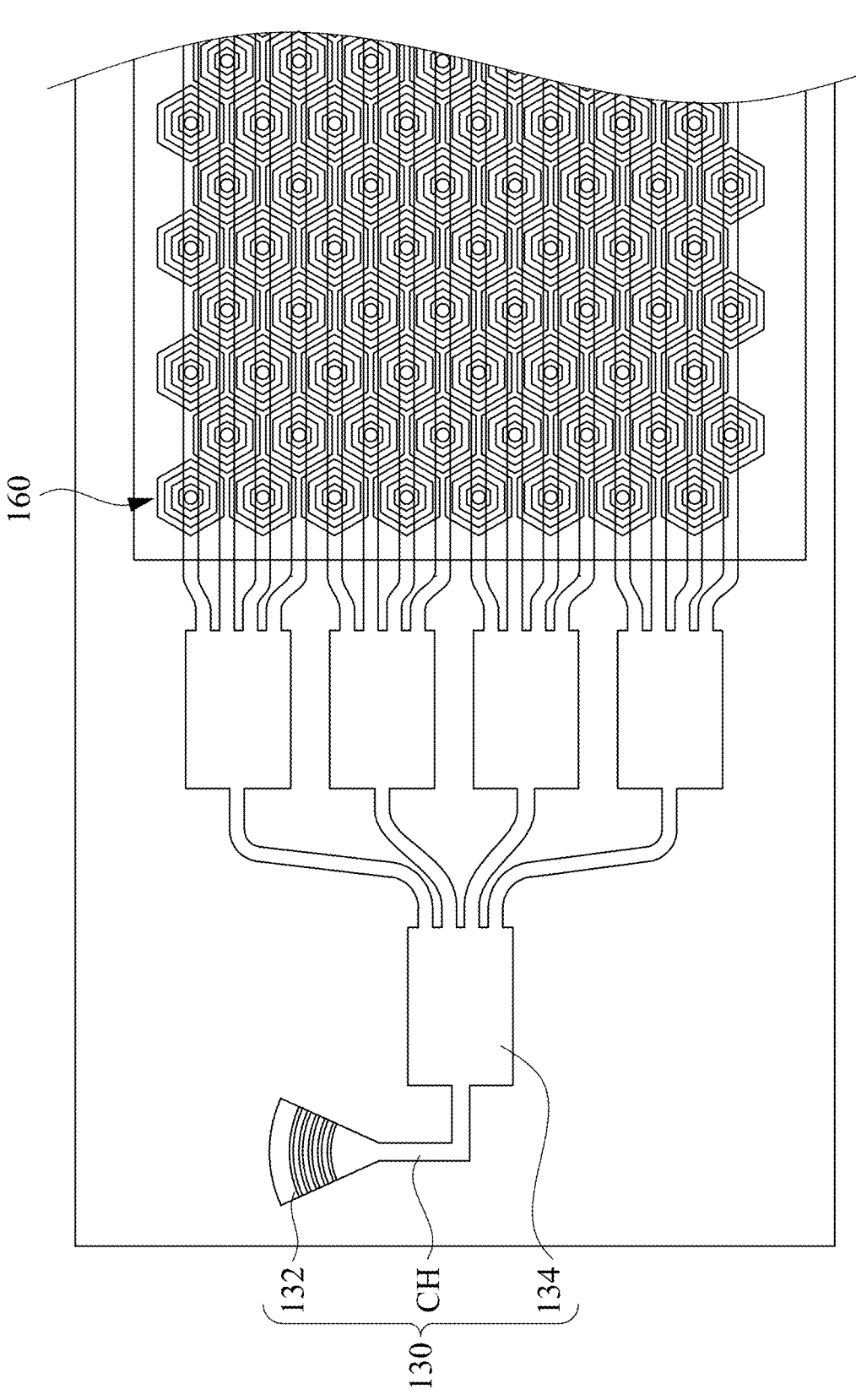
FIG. 25 illustrates a top view of an analytical biochip in some other embodiments of the present disclosure.

FIG. 25 illustrates a top view of an analytical biochip 100 in some other embodiments of the present disclosure. The analytical biochip 100 in FIG. 25 is similar to the analytical biochip 100 in FIG. 1A. The difference is that the waveguide 130 in FIG. 25 is a channel waveguide that includes a grating coupler 132 and guiding portions CH coupled to the grating coupler 132. The guiding portions CH are strips and may be called as channels. The guiding portions CH in FIG. 25 and the guiding portion SL in FIG. 1A have similar function, such as guiding the excitation energy. At least a portion of the guiding portions CH of the waveguide 130 is directly below the nanowells 160, and the excitation energy is guided by the guiding portions CH of the waveguide 130 toward the nanowells 160. The difference is that the excitation energy is guided in more than one direction, such as along the guiding portions CH, in the channel waveguide. In some embodiments, the grating coupler 132 is a sector, and is a combination of curved gratings parallel to each other. The waveguide 130 further includes multimode interference devices 134 connecting with the grating coupler 132 by the guiding portion CH. The multimode interference devices 134 are configured to split one guiding portion CH into multiple guiding portions CH. In some embodiments, a point excitation source may be used in FIG. 25, and the grating coupler 132 is used for receiving the point excitation source into the waveguide 130. The excitation energy propagates in the direction as the area of grating coupler 132 decreases, and the guiding portion CH guides the excitation energy to the multimode interference devices 134. The multimode interference devices 134 subsequently split one guiding portion CH into multiple guiding portions CH, and the guiding portions CH guide the excitation energy toward the nanowells 160.

Figure 26:
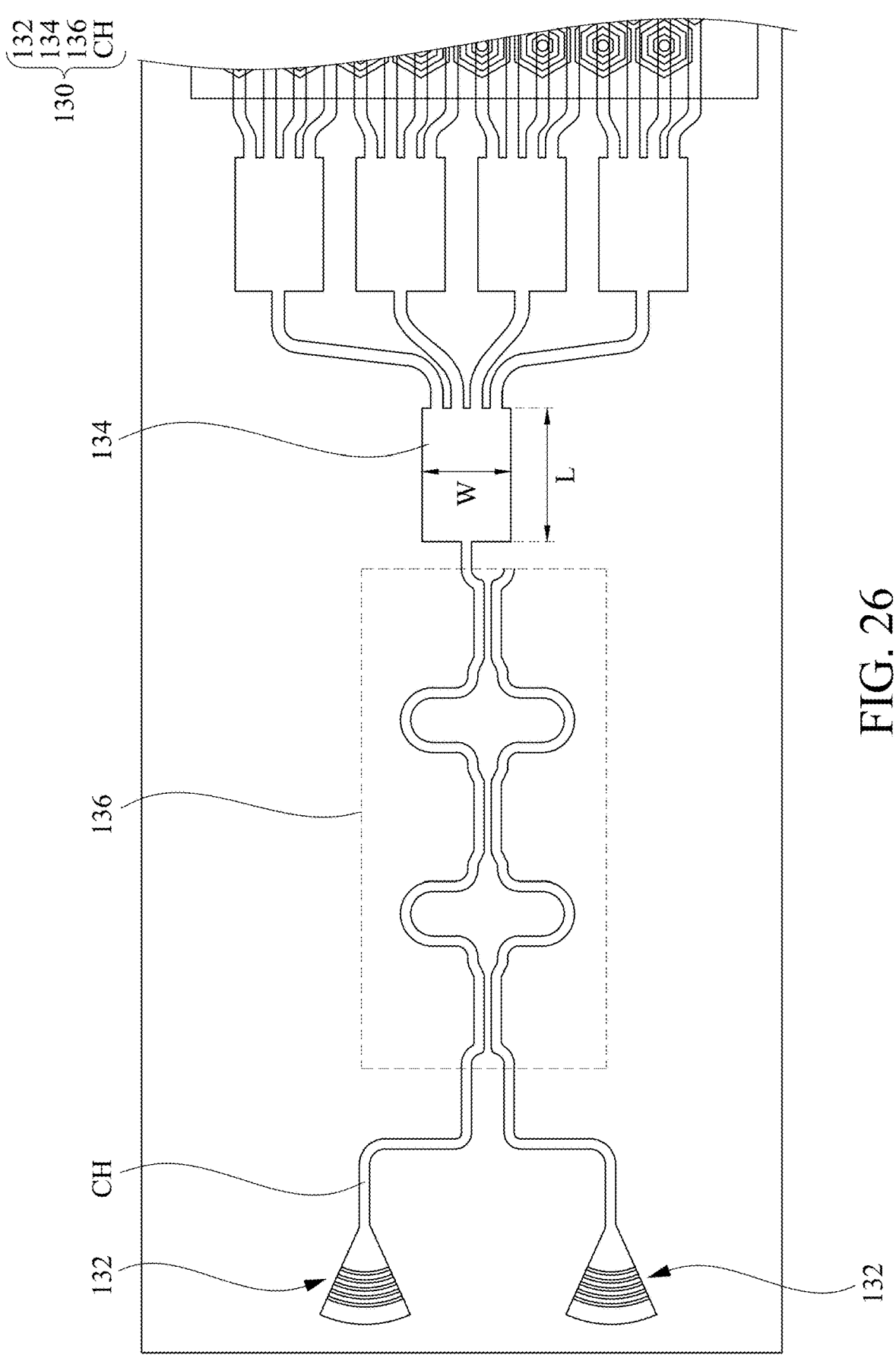
FIG. 26 illustrates a top view of an analytical biochip in some other embodiments of the present disclosure.

FIG. 26 illustrates a top view of an analytical biochip 100 in some other embodiments of the present disclosure. The analytical biochip 100 in FIG. 26 is similar to the analytical biochip 100 in FIG. 25. The difference is that the waveguide 130 in FIG. 26 includes more than one grating couplers 132, and a Mach-Zehnder interferometer-wavelength-division multiplexing device 136 between the grating couplers 132 and the multimode interference device 134. Specifically, two excitation sources with different wavelength are incident on the different grating couplers 132, and the Mach-Zehnder interferometer-wavelength-division multiplexing device 136 is configured to merge two excitation sources with different wavelength into one guiding portion CH. The Mach-Zehnder interferometer-wavelength-division multiplexing (MZI-WDM) device 136 includes two winding guiding portions CH. The guiding portions CH are not in contact with each other in MZI-WDM device 136, but are close to each other at some point. Subsequently, the two excitation sources with different wavelength propagate into the multimode interference devices 134. The multimode interference devices 134 split one guiding portion CH into multiple guiding portions CH, and the excitation energy propagates along the guiding portions CH and reach under the nanowells 160. The parameters of the MZI-WDM device 136 are designed to efficiently merge two excitation sources into one guiding portion CH. In some embodiments, the widths of the guiding portions CH are between 200 nm and 1000 nm. In some embodiments, the minimum gap between the guiding portions CH is between 50 nm and 500 nm. The parameters of the multimode interference devices 134 are also designed to split one guiding portion CH into multiple guiding portions CH. In some embodiments, the length L of the multimode interference device 134 is between 2 microns and 500 microns, and the widths W of the multimode interference device 134 is between 0.5 microns and 20 microns. The parameters of the multimode interference devices 134 and the MZI-WDM device 136 are suitable for visible light as excitation source.

Figures 27A, 27B, 27C:
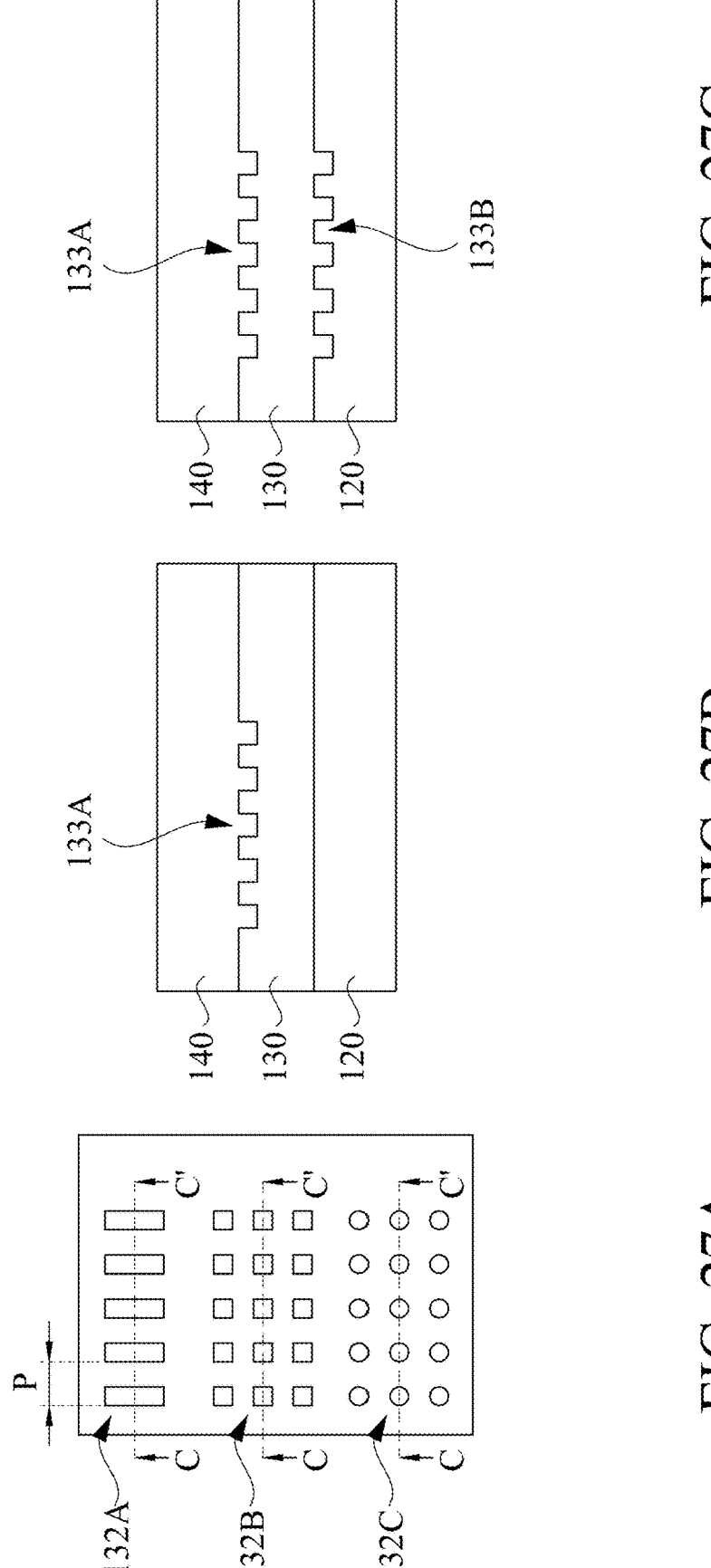
FIGS. 27A-27C illustrate examples of the grating coupler in some embodiments of the present disclosure.

FIGS. 27A-27C illustrate examples of the grating coupler 132 in some embodiments of the present disclosure. FIG. 27A illustrates top views of grating couplers 132A, 132B and 132C. Referring to FIG. 27A, the sizes of the gratings in the grating coupler may be identical, and the period P of the arrangement of the gratings may be identical. The period P of the arrangement of the gratings may be defined as a distance between the front edges of the adjacent gratings. The shape of the gratings may be various. In some embodiments, the gratings may be bar shaped, as shown in grating coupler 132A. In some embodiments, the gratings may be arranged in an array, and the gratings may be square, as shown in grating coupler 132B. In some embodiments, the gratings may be arranged in an array, and the gratings may be round, as shown in grating coupler 132C.

FIG. 27B illustrates cross-section views of grating couplers 132A, 132B and 132C along line C-C' in some embodiments of the present disclosure. FIG. 27C illustrates cross-section views of grating couplers 132A, 132B and 132C in some other embodiments of the present disclosure. In some embodiments, the grating coupler 132 may include a grating structure 133A protruding towards the upper cladding layer 140 and the bottom of the waveguide 130 is planar, as shown in FIG. 27B. In some embodiments, the grating coupler 132 further includes a grating structure 133B protruding towards the lower cladding layer 120, as shown in FIG. 27C.

Figure 28B:
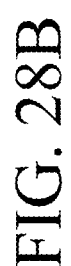
FIGS. 28A-28B illustrate examples of the grating coupler in some embodiments of the present disclosure.
Figure 28B:
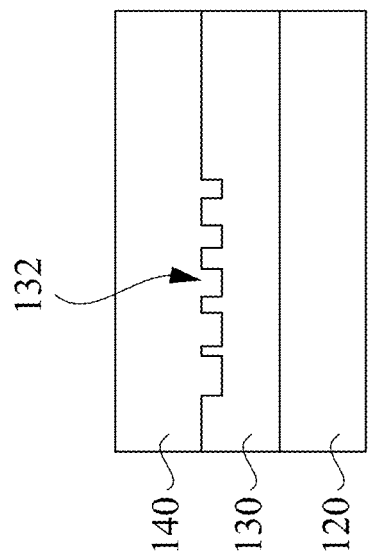
Figure 28A:
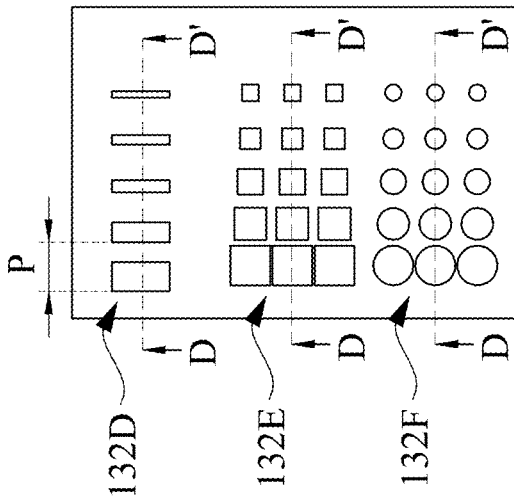

FIGS. 28A-28B illustrate examples of the grating coupler 132 in some embodiments of the present disclosure. FIG. 28A illustrates top views of grating couplers 132D, 132E, and 132F. FIG. 28B illustrates cross-section views of grating couplers 132D, 132E and 132F along line D-D' in some embodiments of the present disclosure. Referring to FIGS. 28A and 28B, the sizes of the gratings in the grating coupler 132 may be different, and the sizes of the gratings may decrease in a certain direction. The period P of the arrangement of the gratings may be identical. The shape of the gratings may be various. In some embodiments, the gratings may be bar shaped, as shown in grating coupler 132D. In some embodiments, the gratings may be arranged in an array, and the gratings may be square, as shown in grating coupler 132E. In some embodiments, the gratings may be arranged in an array, and the gratings may be round, as shown in grating coupler 132F.

Figure 29B:
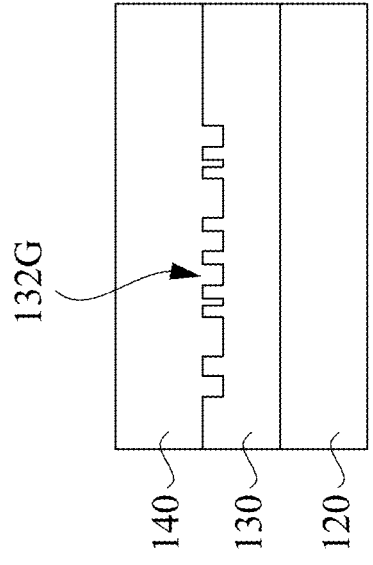
FIGS. 29A-29B illustrate examples of the grating coupler in some embodiments of the present disclosure.
Figure 29A:
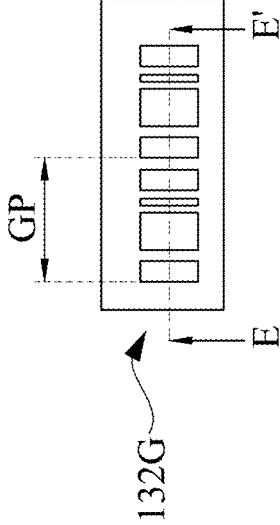

FIGS. 29A-29B illustrate an example of the grating coupler 132 in some embodiments of the present disclosure. FIG. 29A illustrates top views of grating coupler 132G. FIG. 29B illustrates cross-section views of grating coupler 132G along line E-E' in some embodiments of the present disclosure. Referring to FIGS. 29A and 29B, the gratings in the grating coupler 132G are arranged in groups, and the period GP of the groups are identical. The period GP of the groups may be defined as a distance between the front edges of the adjacent groups. In each group, the gratings are arranged irregularly, and each of the groups has identical arrangement.

Figure 30:
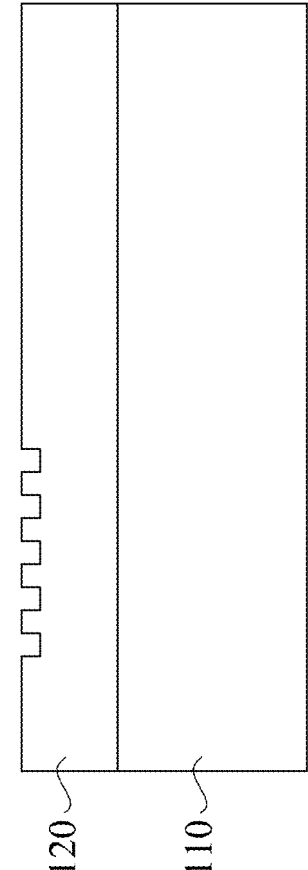
FIGS. 30 and 31 illustrate cross-section views of forming the grating coupler in FIG. 27C.
Figure 31:
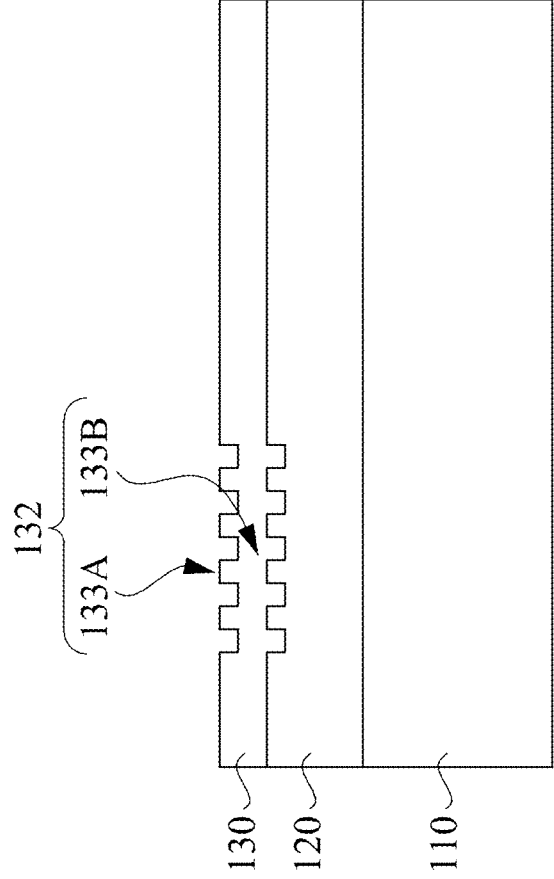

FIGS. 30 and 31 illustrate cross-section views of forming the grating coupler 132 in FIG. 27C. Referring to FIG. 30, a lower cladding layer 120 is formed over a substrate 110. After forming the lower cladding layer 120, the upper surface of the lower cladding layer 120 may be patterned by an etching process, and a plurality recesses are formed at the upper surface of the lower cladding layer 120.

Subsequently, referring to FIG. 31, a dielectric layer is formed over the lower cladding layer 120. The dielectric layer fills the recesses at the upper surface of the lower cladding layer 120. Therefore, a grating structure 133B is formed at the upper surface of the lower cladding layer 120. Subsequently, a grating structure 133A is formed protruding upwards (for example, protruding toward the upper cladding layer 140 after the upper cladding layer is formed). The grating structure 133A may be formed by patterning the upper surface of the dielectric layer by an etching process. The patterned dielectric layer becomes the waveguide 130. After forming the grating coupler 132, the subsequent process is continued to forming the analytical biochip 100.

As mentioned above, the analytical biochip of the present disclosure includes an emission light collection element to enhance the emission light collection ratio from samples in nanowells. Also, the distance between the bottom opening of the nanowells and the guiding portion of the waveguide is designed to compensate the propagation loss of the excitation energy, so that the samples in the nanowells receive similar amount of the excitation energy. Moreover, a sacrificial layer is formed conformally over the sidewall of the nanowells. Therefore, the adherent layer may be formed at the bottom openings of the nanowells, which are not covered by the sacrificial layer, and the samples are be able to be selectively immobilized at the bottom openings of the nanowells.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An analytical biochip, comprising:
a substrate;
a lower cladding layer over the substrate;
a waveguide over the lower cladding layer, wherein the waveguide comprises a grating coupler and a guiding portion coupled to the grating coupler, wherein the grating coupler is configured to receive excitation energy from an excitation source, and the guiding portion is configured to guide the excitation energy;
an upper cladding layer over the waveguide;
an emission light collection element over the upper cladding layer, wherein the emission light collection element comprises lower protrusion structures extending into the upper cladding layer, and the emission light collection element is made of metal; and
a plurality of nanowells penetrating the emission light collection element and in the upper cladding layer, wherein the plurality of nanowells are configured to receive samples tagged with fluorescent tags, and at least a portion of the guiding portion of the waveguide is directly below the plurality of nanowells;

wherein each of the plurality of nanowells is spaced apart from the grating coupler, and the excitation energy is guided by the guiding portion of the waveguide toward the plurality of nanowells to thereby enable the fluorescent tags of the samples in the plurality of nanowells to absorb the excitation energy and emit light.

2. The analytical biochip of claim 1, wherein in each of the plurality of nanowells, a depth of the nanowell is greater than a diameter of a top opening of the nanowell.

3. The analytical biochip of claim 1, wherein in each of the plurality of nanowells, an area of a top opening of the nanowell is a first area, a sum of an area of a sidewall of the nanowell and an area of a bottom opening of the nanowell is a second area, and the first area is less than half of the second area.

4. The analytical biochip of claim 1, further comprising:
a sacrificial layer conformally disposed over the emission light collection element and sidewalls of the plurality of nanowells.

5. The analytical biochip of claim 1, wherein:
the substrate, the lower cladding layer, the waveguide, the upper cladding layer, and the emission light collection element are stacked in a first direction;
the plurality of nanowells include a first nanowell and a second nanowell;
when viewed in a cross section cut along the first direction and that intersects the grating coupler and the first and second nanowells, the second nanowell is farther from the grating coupler than the first nanowell in a second direction perpendicular to the first direction, and a distance between a bottom opening of the second nanowell and an upper surface of the guiding portion of the waveguide is less than a distance between a bottom opening of the first nanowell and the upper surface of the guiding portion of the waveguide.

6. The analytical biochip of claim 5, wherein a diameter of a top opening of the second nanowell is greater than a diameter of a top opening of the first nanowell.

7. The analytical biochip of claim 5, wherein a distance between a top opening of the second nanowell and the upper surface of the guiding portion of the waveguide is less than a distance between a top opening of the first nanowell and the upper surface of the guiding portion of the waveguide, and a diameter of the top opening of the second nanowell and a diameter of the top opening of the first nanowell are identical.

8. The analytical biochip of claim 1, wherein the grating coupler comprises:
a grating structure protruding towards the upper cladding layer.

9. The analytical biochip of claim 1, wherein the grating coupler comprises:
a first grating structure protruding towards the lower cladding layer; and
a second grating structure protruding towards the upper cladding layer.

10. The analytical biochip of claim 1, further comprising:
a light focusing monitor below bottom openings of the plurality of nanowells.

11. The analytical biochip of claim 10, wherein the substrate is a transparent substrate, and the light focusing monitor is virtual monitor with a minimum resolvable diameter by a lens or objective under the substrate.

12. The analytical biochip of claim 10, wherein the substrate is a semiconductor substrate, and the light focusing monitor is a photodiode over the substrate.

13. The analytical biochip of claim 1, wherein the lower protrusion structures of the emission light collection element are gratings.

14. The analytical biochip of claim 1, wherein the lower protrusion structures of the emission light collection element are meta-atoms of a metasurface.

15. A method of forming an analytical biochip, comprising:
forming a lower cladding layer over a substrate;
forming a waveguide over the lower cladding layer, wherein the waveguide comprises a grating coupler and a guiding portion coupled to the grating coupler, wherein the grating coupler is configured to receive excitation energy from an excitation source, and the guiding portion is configured to guide the excitation energy;
forming an upper cladding layer over the waveguide;
patterning the upper cladding layer to form upper protrusion structures at an upper surface of the upper cladding layer;
forming an emission light collection element covering the upper protrusion structures, wherein portions of the emission light collection element extends into the upper cladding layer, and the emission light collection element is made of metal; and
forming a plurality of nanowells penetrating the emission light collection element and in the upper cladding layer, wherein the plurality of nanowells are configured to receive samples tagged with fluorescent tags, and at least a portion of the guiding portion of the waveguide is directly below the plurality of nanowells;
wherein each of the plurality of nanowells is spaced apart from the grating coupler, and the excitation energy is guided by the guiding portion of the waveguide toward the plurality of nanowells to thereby enable the fluorescent tags of the samples in the plurality of nanowells to absorb the excitation energy and emit light.

16. The method of claim 15, wherein:
the substrate, the lower cladding layer, the waveguide, the upper cladding layer, and the emission light collection element are stacked in a first direction;
the plurality of nanowells include a first nanowell and a second nanowell;
when viewed in a cross section cut along the first direction and that intersects the grating coupler and the first and second nanowells, the second nanowell is farther from the grating coupler than the first nanowell in a second direction perpendicular to the first direction, and a distance between a bottom opening of the second nanowell and an upper surface of the guiding portion of the waveguide is less than a distance between a bottom opening of the first nanowell and the upper surface of the guiding portion of the waveguide.

17. The method of claim 15, further comprising:
forming a sacrificial layer conformally over the emission light collection element and the plurality of nanowells; and
removing the sacrificial layer at bottom openings of the plurality of nanowells.

18. The method of claim 17, wherein in each of the plurality of nanowells, a depth of the nanowell is greater than a diameter of a top opening of the nanowell.

19. The method of claim 18, wherein in each of the plurality of nanowells, an area of a top opening of the nanowell is a first area, a sum of an area of a sidewall of the nanowell and an area of a bottom opening of the nanowell is a second area, and the first area is less than half of the second area.

20. The method of claim 17, further comprising:

coating an adherent layer conformally over the sacrificial layer and the bottom openings of the plurality of nanowells; and removing the sacrificial layer and the adherent layer conformally over the sacrificial layer.

* * * * *